(12) United States Patent
Kamoi et al.

(10) Patent No.: US 12,435,911 B2
(45) Date of Patent: Oct. 7, 2025

(54) FREE-PISTON STIRLING ENGINE

(71) Applicant: Twinbird Corporation, Niigata (JP)

(72) Inventors: Junichi Kamoi, Niigata (JP); Kazuya Kondo, Niigata (JP)

(73) Assignee: Twinbird Corporation, Niigata (JP)

( * ) Notice: Subject to any disclaimer, the term of this patent is extended or adjusted under 35 U.S.C. 154(b) by 0 days.

(21) Appl. No.: 18/688,246

(22) PCT Filed: Aug. 8, 2022

(86) PCT No.: PCT/JP2022/030259
§ 371 (c)(1),
(2) Date: Feb. 29, 2024

(87) PCT Pub. No.: WO2023/032604
PCT Pub. Date: Mar. 9, 2023

(65) Prior Publication Data
US 2024/0376850 A1   Nov. 14, 2024

(30) Foreign Application Priority Data

Aug. 30, 2021  (JP) ................................ 2021-140025

(51) Int. Cl.
*F25B 9/14*     (2006.01)
*F01B 29/10*    (2006.01)
*F02G 1/043*    (2006.01)

(52) U.S. Cl.
CPC ............... *F25B 9/14* (2013.01); *F01B 29/10* (2013.01); *F02G 1/0435* (2013.01)

(58) Field of Classification Search
CPC .... F02G 1/0435; F02G 1/043; F02G 2243/02; F02G 2275/20; F02G 1/053;
(Continued)

(56) References Cited

U.S. PATENT DOCUMENTS

2003/0111311 A1\* 6/2003 Saito ..................... F16F 7/116
                                                  188/380
2006/0254270 A1   11/2006 Tanaka
(Continued)

FOREIGN PATENT DOCUMENTS

CN      104696407 A  \*  6/2015
DE       19741627 A1 \*  3/1999  .............. F16F 7/116
(Continued)

OTHER PUBLICATIONS

DE-19741627-A1, English language machine translation (Year: 1999).\*

(Continued)

*Primary Examiner* — Wesley G Harris
(74) *Attorney, Agent, or Firm* — Akerman LLP

(57) ABSTRACT

Provided is a free-piston Stirling engine that can be easily manufactured by reducing manufacturing processes. A free-piston Stirling refrigerator comprises: a piston capable of reciprocating inside a first cylinder; a first leaf spring for controlling the reciprocating motion of the piston; a connection body for connecting the piston to the movable portion of the first leaf spring; a support arm portion for supporting the fixation portion of the first leaf spring in a state where the positional relation with the first cylinder is fixed; a washer for adjusting the movable mass mp of a piston assembly; and an attachment portion that is disposed on the connection body 13 and to which the washer is attached, and the attachment portion is disposed in such position as to enable the washer to be attached while the piston assembly is assembled, thereby reducing disassembly and reassembly processes and allowing easy manufacturing.

6 Claims, 12 Drawing Sheets

(58) Field of Classification Search
CPC ........... F02G 2243/202; F02G 2280/10; F01B 29/10; F25B 9/14; F25B 2309/001; F16F 7/116
See application file for complete search history.

(56) References Cited

U.S. PATENT DOCUMENTS

2008/0256945 A1   10/2008   Welty et al.
2011/0056196 A1   3/2011    Berchowitz et al.

FOREIGN PATENT DOCUMENTS

| JP | H11201035 A | * | 7/1999 | ............. F04B 35/04 |
| JP | 2003247580 A | * | 9/2003 | ................ F16F 1/18 |
| JP | 2004251180 A | * | 9/2004 | ............. F02G 1/043 |
| JP | 2015057504 A | | 3/2015 | |
| JP | 2017155611 A | * | 9/2017 | ............. F02G 1/053 |
| WO | WO-2004090441 A1 | * | 10/2004 | ............. F02G 1/043 |

OTHER PUBLICATIONS

WO-2004090441-A1, English language machine translation (Year: 2004).*
CN 104696407, english language machine translation (Year: 2015).*
International Search Report issued Oct. 11, 2022 in connection with PCT/JP2022/030259.

* cited by examiner (a)

(b)

(c)

(a)

(b)

(c)

(a)

(b)

(c)

(a)

(b)

(c)

FREE-PISTON STIRLING ENGINE

CROSS-REFERENCE TO RELATED APPLICATIONS

This application is a national phase of PCT/JP2022/030259, filed Aug. 8, 2022, and claims priority to Japanese Patent Application No. 2021-140025, filed on Aug. 30, 2021, the entire contents of both of which are hereby incorporated by reference.

TECHNICAL FIELD

The present invention relates to a free-piston Stirling engine.

BACKGROUND ART

Conventionally, as such a type of free-piston Stirling engine, there is known one having: a cylinder; a piston and a displacer as reciprocating bodies capable of reciprocating in the axial direction inside the cylinder; a leaf spring as an elastic body for controlling reciprocating motions of the piston and the displacer; a sleeve and a perforated bolt, and a rod and a nut as connection bodies for connecting the piston and the displacer to the central portion of the leaf spring that serves as a movable portion; a fixed axis, a spacer and a nut as support bodies that support the outer circumferential portion of the leaf spring that is a fixation portion while the positional relation of the outer circumferential portion to the cylinder is fixed (e.g., Patent Document 1). In such a free-piston Stirling engine, a resonance frequency determined by a spring constant and a movable mass of the leaf spring is optimized by the piston assembly and the displacer assembly, thereby facilitating operation with a phase difference between the piston and the displacer being maintained. In this manner, in the Patent Document 1, in order to adjust the resonance frequencies of the piston assembly and the displacer assembly, an additional weight (corresponding to the weight body of the present invention) was added by using a washer(s).

PRIOR ART DOCUMENTS

Patent Documents

Patent document 1: JP-A-2004-309080

SUMMARY OF THE INVENTION

Problems to be Solved by the Invention

In the Patent Document 1, after assembling the piston assembly and the displacer assembly, they are fixed to a fixing base separate from the Stirling engine to provide micro-vibration thereto, and the respective resonance frequencies are measured to calculate the additional weight. Then, the piston assembly and the displacer assembly are once removed from the fixing base and disassembled, and the washer, which is the additional weight, is integrated with the piston assembly and the displacer assembly. Here, the addition of the washer(s) to the piston assembly is carried out by sandwiching the washer together with the leaf spring between the sleeve and the perforated bolt when screwing together the boss portion of the sleeve and the perforated bolt serving as connection bodies for fixing the piston to the leaf spring. Similarly, the addition of the washer(s) to the displacer assembly is carried out by sandwiching the washer together with the leaf spring between the rod and the nut when screwing together the rod and the nut as connection bodies for fixing the displacer to the leaf spring. Namely, in the Patent Document 1, since the processes of assembly, resonance frequency measurement, disassembly, and reassembly have to be taken, not only manufacturing is made time-consuming, but a risk of component damage due to the additional process is also increased, which has been a problem.

It is an object of the present invention to solve the above problem by providing a free-piston Stirling engine capable of reducing the manufacturing processes and reducing the risk of component damage.

Means to Solve the Problems

A free-piston Stirling engine as described in claim 1 of the present invention includes: a cylinder: a reciprocating body capable of reciprocating inside the cylinder along an axial direction of the cylinder: an elastic body for controlling a reciprocating motion of the reciprocating body: a connection body for connecting the reciprocating body to a movable portion of the elastic body: a support body for supporting a fixation portion of the elastic body with a positional relation between the fixation portion and the cylinder being fixed: a weight body for adjusting a movable mass including the reciprocating body and the connection body; and an attachment portion that is provided at the connection body or the reciprocating body, and is for attaching the weight body, wherein the attachment portion is provided in a location to which the weight body can be attached with the cylinder, the reciprocating body, the elastic body, the connection body, and the support body being already assembled.

Further, the free-piston Stirling engine as described in claim 2 of the present invention is such that, in claim 1, the elastic body is a leaf spring, and the attachment portion is provided on a side of the leaf spring that is opposite to the reciprocating body.

Furthermore, the free-piston Stirling engine as described in claim 3 of the present invention is such that, in claim 2, the attachment portion is coaxial with the reciprocating body, and the weight body is coaxially attached to the attachment portion.

Furthermore, the free-piston Stirling engine as described in claim 4 of the present invention is such that, in claim 3, the weight body is a washer, the attachment portion is composed of a female screw member and a male screw member that is to be screwed to the female screw member, and the washer is capable of being sandwiched by screwing together the male screw member and the female screw member.

Furthermore, the free-piston Stirling engine as described in claim 5 of the present invention is such that, in claim 3, the weight body is a male screw member, the attachment portion is a female screw member, the male screw member and the female screw member are capable of being screwed together, and any of multiple types of the male screw members with different weights is capable of being screwed to the female screw member.

Effect of the Invention

As for the free-piston Stirling engine according to claim 1 of the present invention, due to the above configuration, the movable mass can be adjusted with the cylinder, the reciprocating body, the elastic body, the connection body, and the support body being already assembled, thereby making it possible to easily manufacture the free-piston Stirling engine by reducing the processes of disassembly and reassembly, and making it possible to reduce the risk of component damage by reducing such processes.

Here, the elastic body is the leaf spring, and the attachment portion is provided on the side of the leaf spring that is opposite to the reciprocating body, thereby making it possible to easily adjust the movable mass with the cylinder, the reciprocating body, the elastic body, the connection body, and the support body being already assembled.

Further, the attachment portion is coaxial with the reciprocating body, and the weight body is coaxially attached to the attachment portion, thereby making it possible to perform the reciprocating motion of the reciprocating body in a well-balanced manner.

Furthermore, the weight body is the washer, the attachment portion is composed of the female screw member and the male screw member that is to be screwed to the female screw member, and the washer is capable of being sandwiched by screwing together the male screw member and the female screw member, thereby making it possible to easily adjust the movable mass by changing the number and/or mass of the washer.

Furthermore, the weight body is the male screw member, the attachment portion is the female screw member, the male screw member and the female screw member are capable of being screwed together, and any of multiple types of the male screw members with different weights is capable of being screwed to the female screw member, thereby making it possible to easily adjust the movable mass upon selecting and screwing any of the male screw members.

MODE FOR CARRYING OUT THE INVENTION

Figure 1:
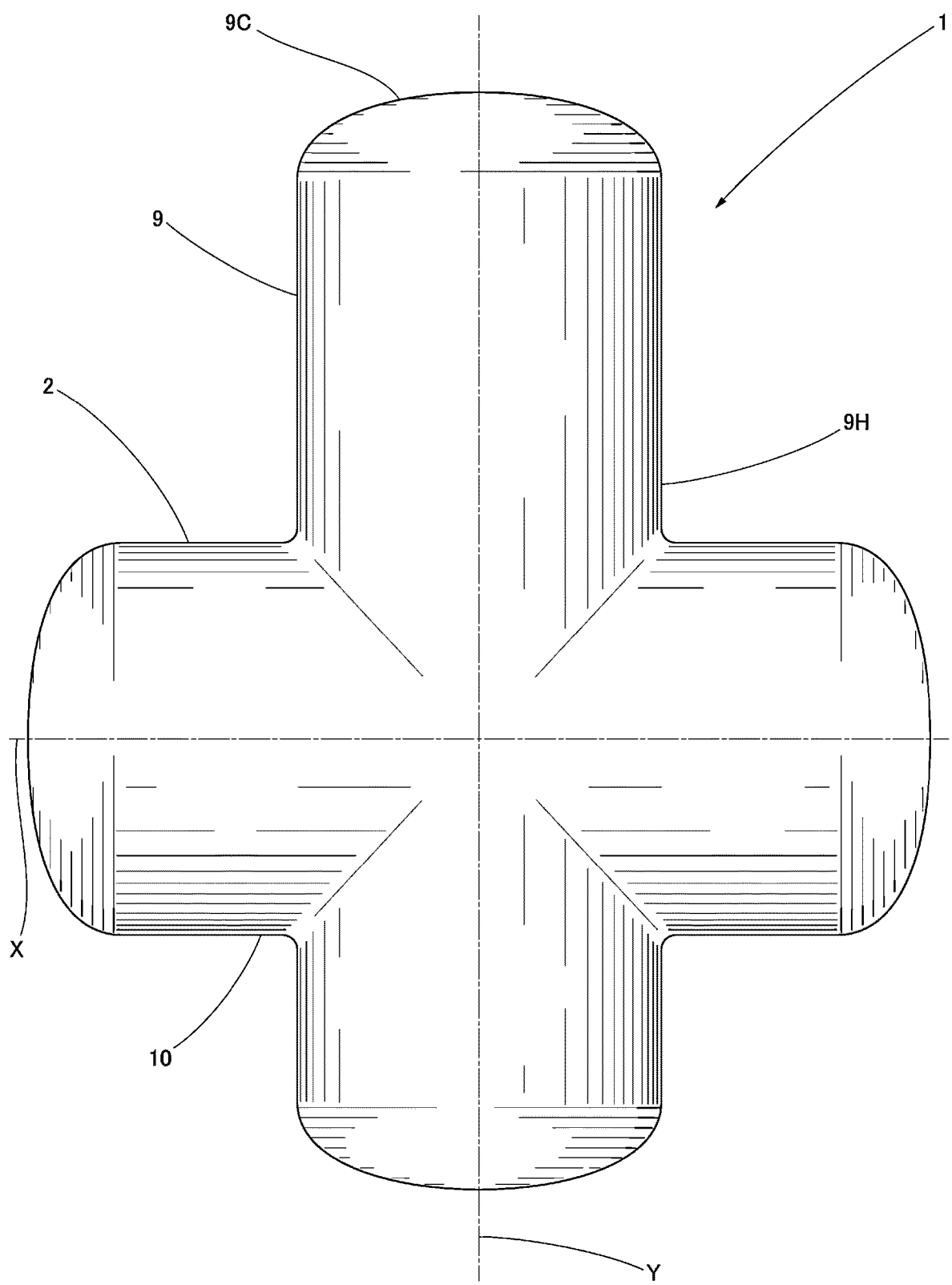
FIG. 1 is an external view of a free-piston Stirling engine of the present invention.
Figure 2:
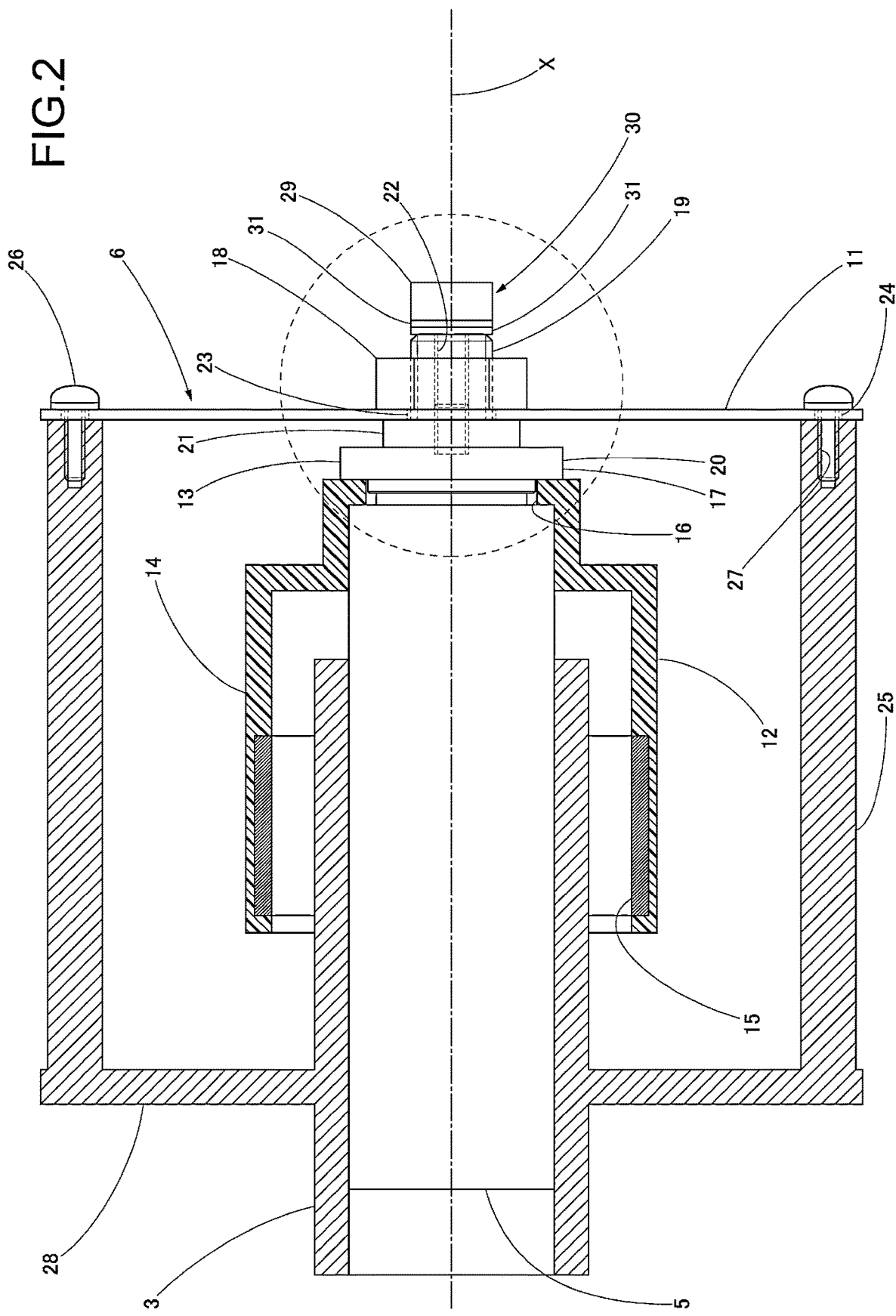
FIG. 2 is a schematic view of a piston assembly of the present invention.
Figure 3:
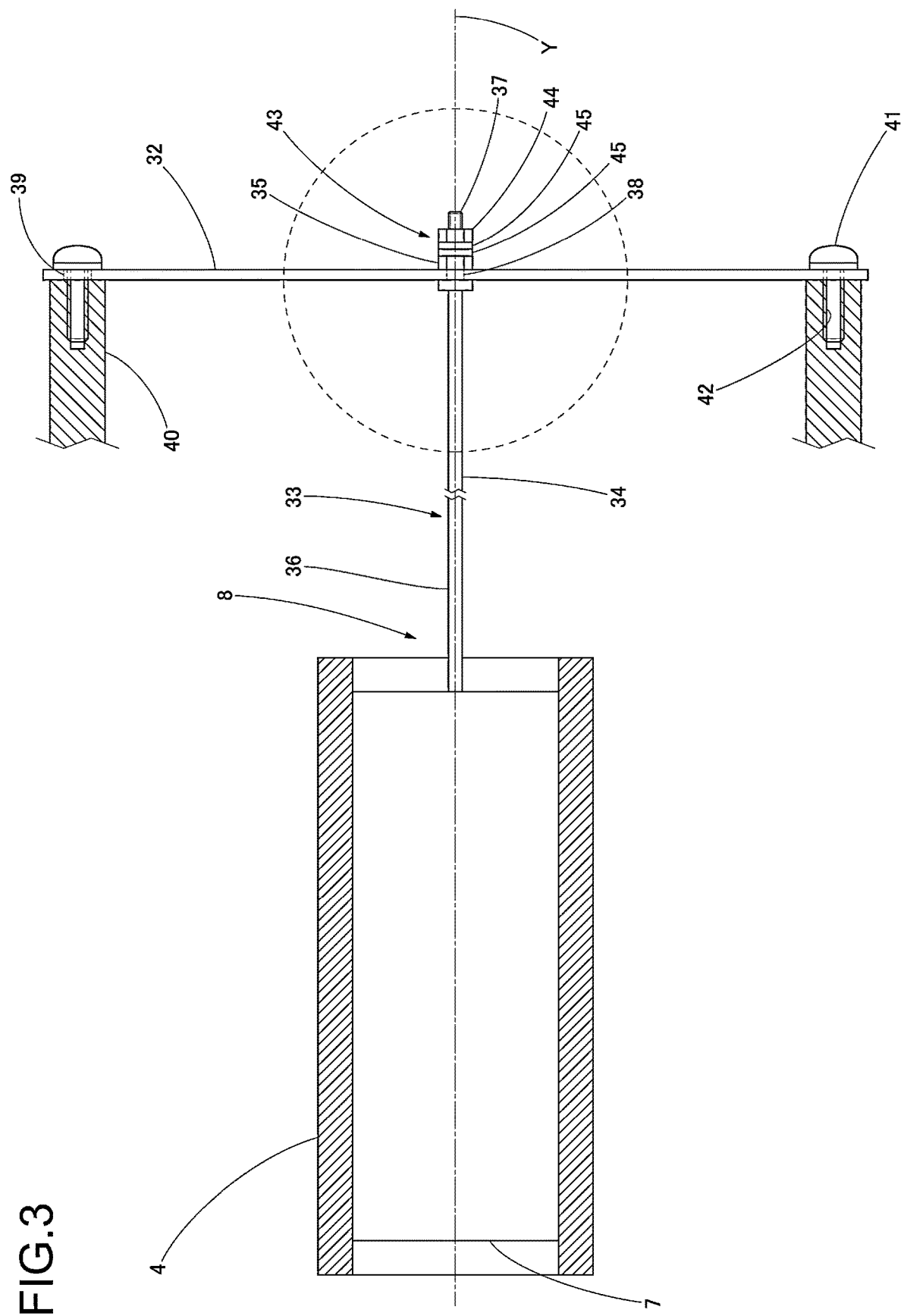
FIG. 3 is a schematic view of a displacer assembly of the present invention.
Figure 4:
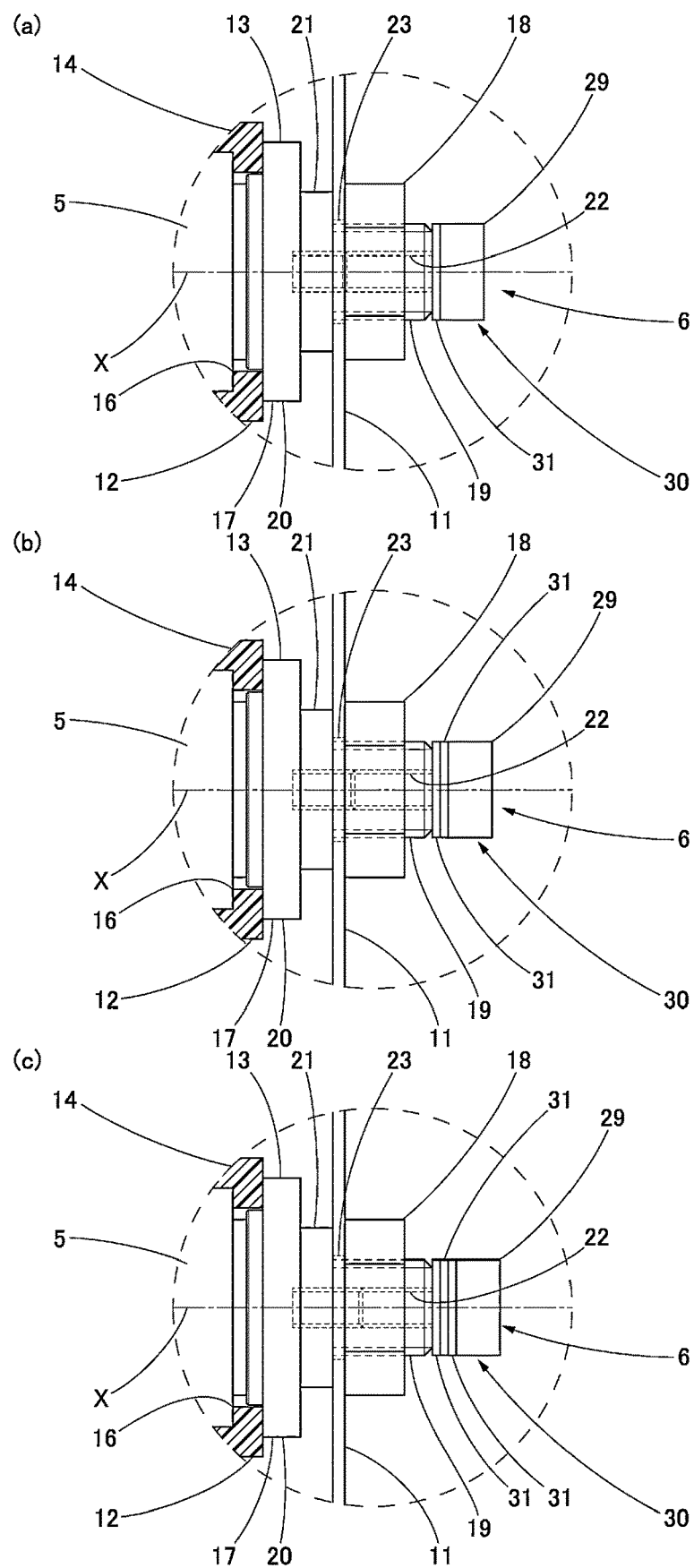
FIG. 4A is a diagram for explaining adjustments of a movable mass of a piston assembly in a first embodiment of the present invention, in which the number of washers 31 is one.
FIG. 4B is a diagram for explaining adjustments of the movable mass of the piston assembly in the first embodiment of the present invention, in which the number of the washers 31 is two.
FIG. 4C is a diagram for explaining adjustments of the movable mass of the piston assembly in the first embodiment of the present invention, in which the number of the washers 31 is three.
Figure 5:
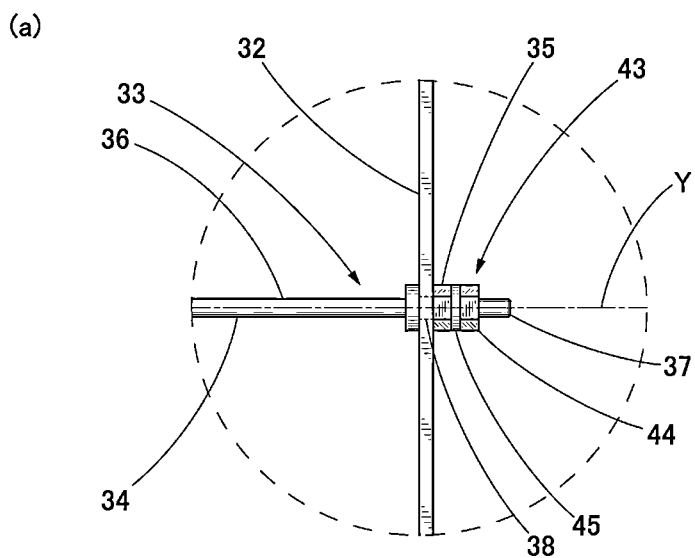
FIG. 5A is an explanatory diagram for explaining adjustments of a movable mass of a displacer assembly in the first embodiment of the present invention, in which the number of the washers 45 is one.
FIG. 5B is an explanatory diagram for explaining adjustments of the movable mass of the displacer assembly in the first embodiment of the present invention, in which the number of the washers 45 is two.
FIG. 5C is an explanatory diagram for explaining adjustments of the movable mass of the displacer assembly in the first embodiment of the present invention, in which the number of the washers 45 is three.
Figure 5:
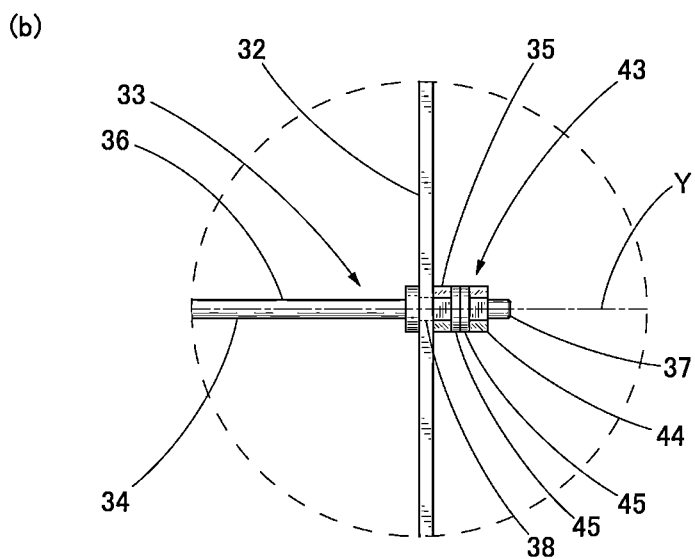
Figure 5:
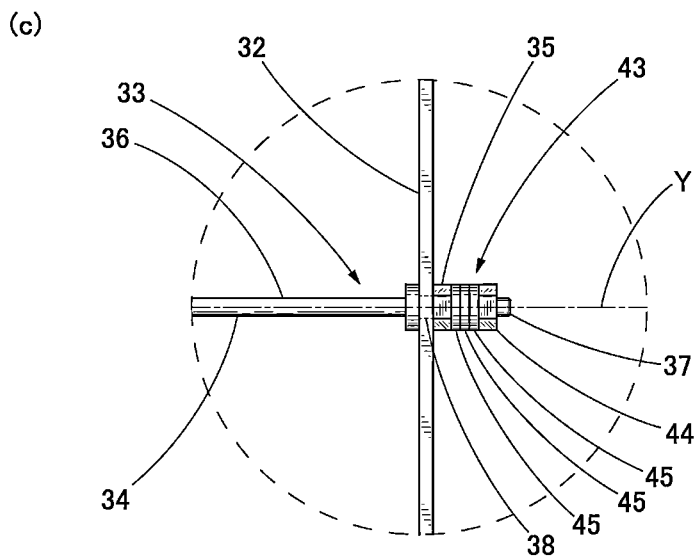
Figure 6:
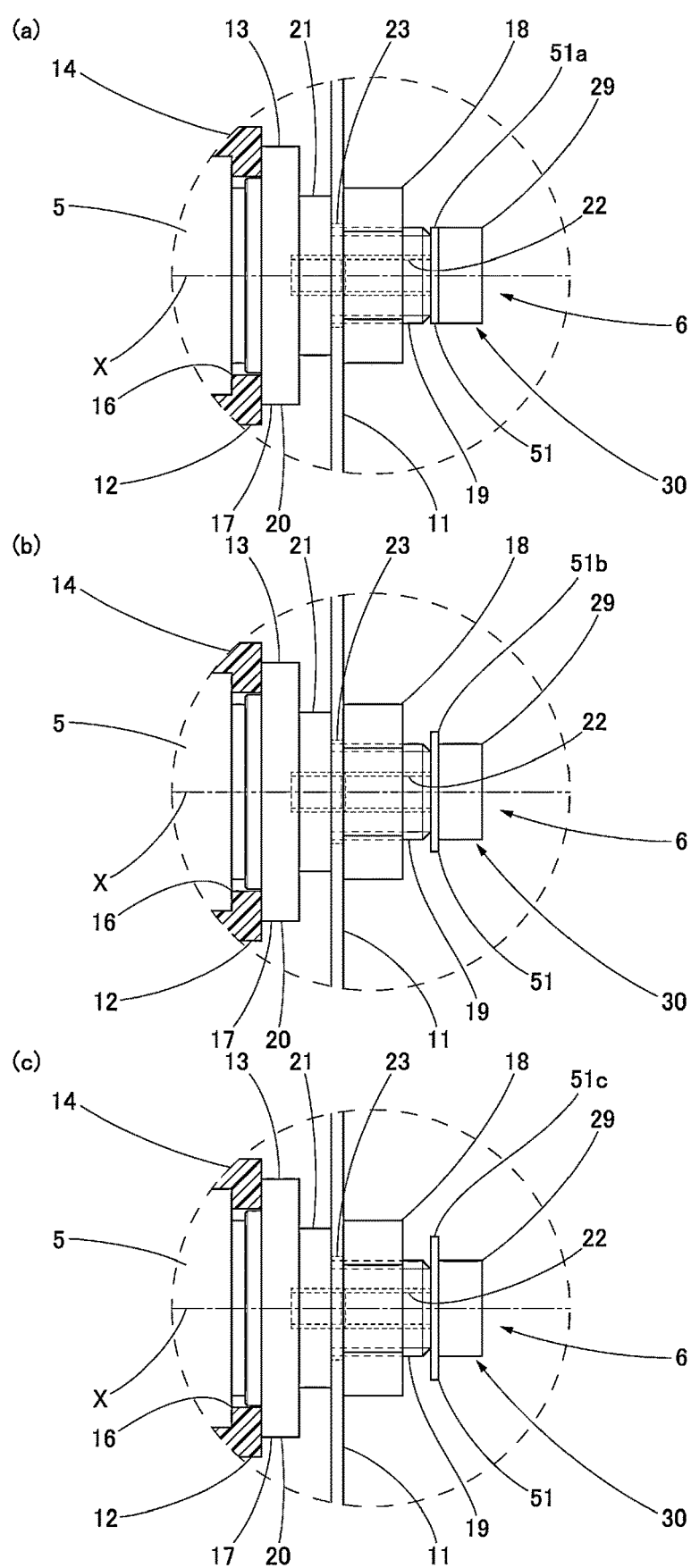
FIG. 6A is an explanatory diagram for explaining adjustments of a movable mass of a piston assembly in a free-piston Stirling engine of a second embodiment of the present invention, in which a washer 51a with a smaller diameter is used.
FIG. 6B is an explanatory diagram for explaining adjustments of the movable mass of the piston assembly in the free-piston Stirling engine of the second embodiment of the present invention, in which a washer 51b with a medium diameter is used.
FIG. 6C is an explanatory diagram for explaining adjustments of the movable mass of the piston assembly in the free-piston Stirling engine of the second embodiment of the present invention, in which a washer 51c with a larger diameter is used.
Figure 7:
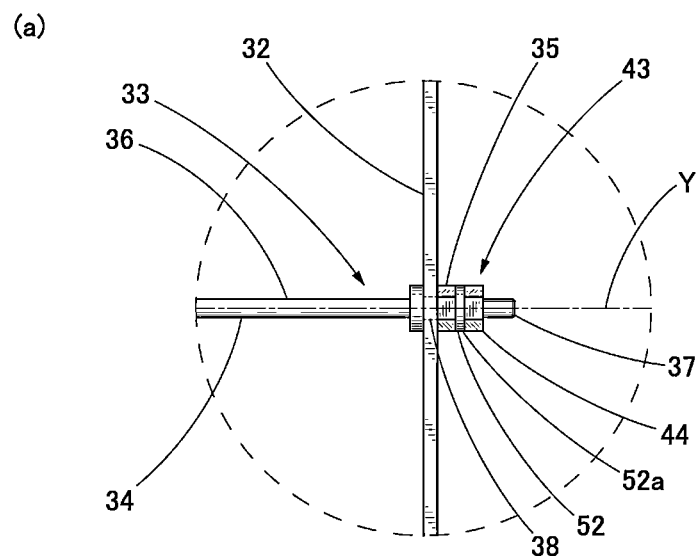
FIG. 7A is an explanatory diagram for explaining adjustments of a movable mass of a displacer assembly of the second embodiment of the present invention, in which a washer 52a with a smaller diameter is used.
FIG. 7B is an explanatory diagram for explaining adjustments of the movable mass of the displacer assembly of the second embodiment of the present invention, in which a washer 52b with a medium diameter is used.
FIG. 7C is an explanatory diagram for explaining adjustments of the movable mass of the displacer assembly of the second embodiment of the present invention, in which a washer 52c with a larger diameter is used.
Figure 7:
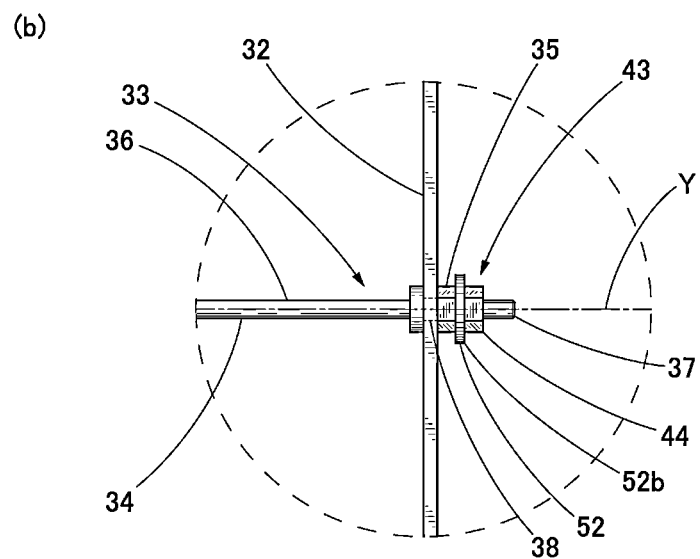
Figure 7:
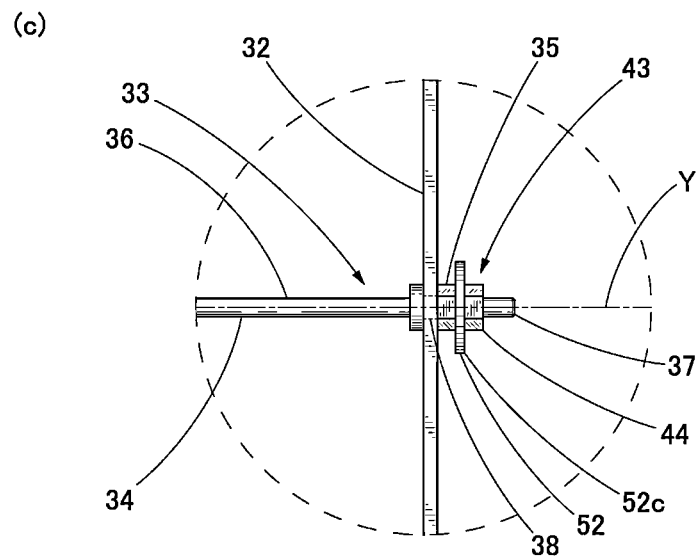
Figure 8:
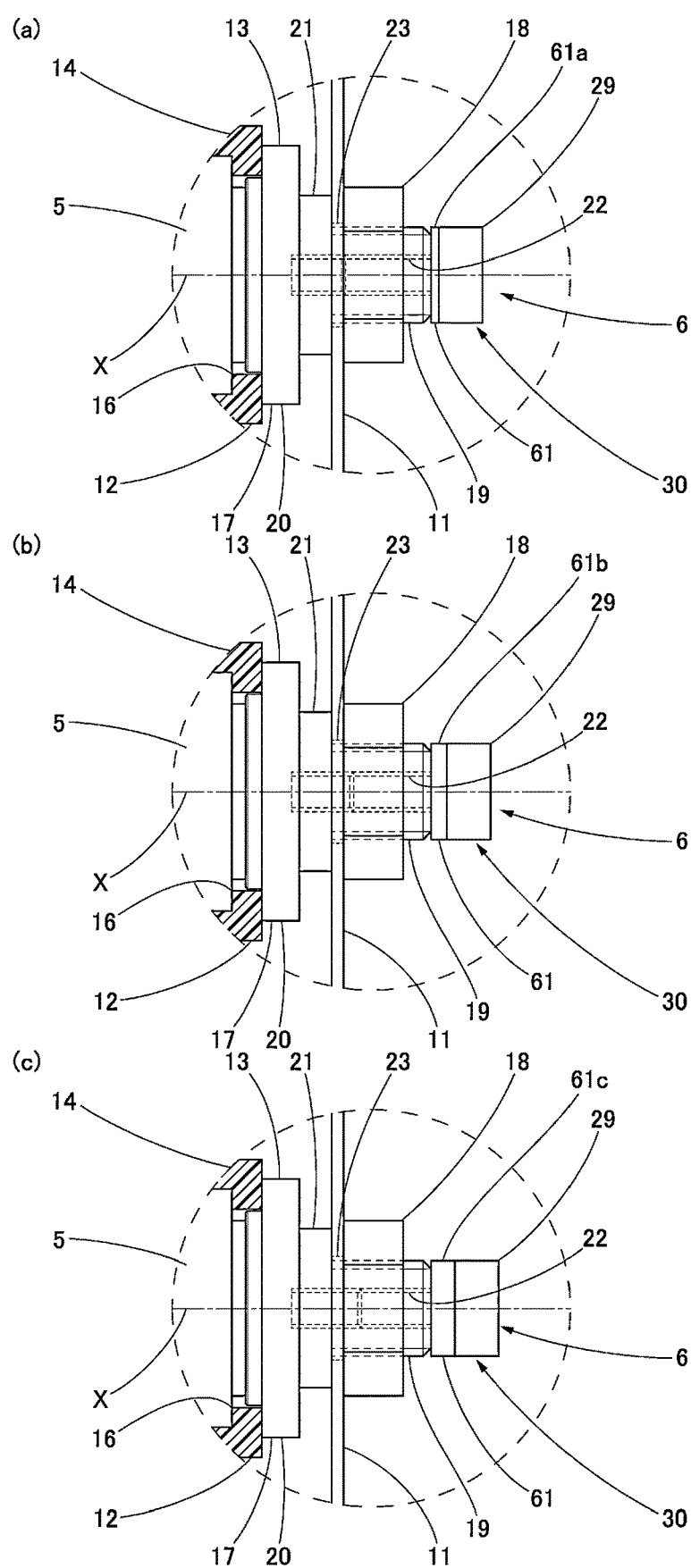
FIG. 8A is an explanatory diagram for explaining adjustments of a movable mass of a piston assembly in a free-piston Stirling engine of a third embodiment of the present invention, in which a thinner washer 61a is used.
FIG. 8B is an explanatory diagram for explaining adjustments of the movable mass of the piston assembly in the free-piston Stirling engine of the third embodiment of the present invention, in which a washer 61b with a medium thickness is used.
FIG. 8C is an explanatory diagram for explaining adjustments of the movable mass of the piston assembly in the free-piston Stirling engine of the third embodiment of the present invention, in which a thicker washer 61c is used.
Figure 9:
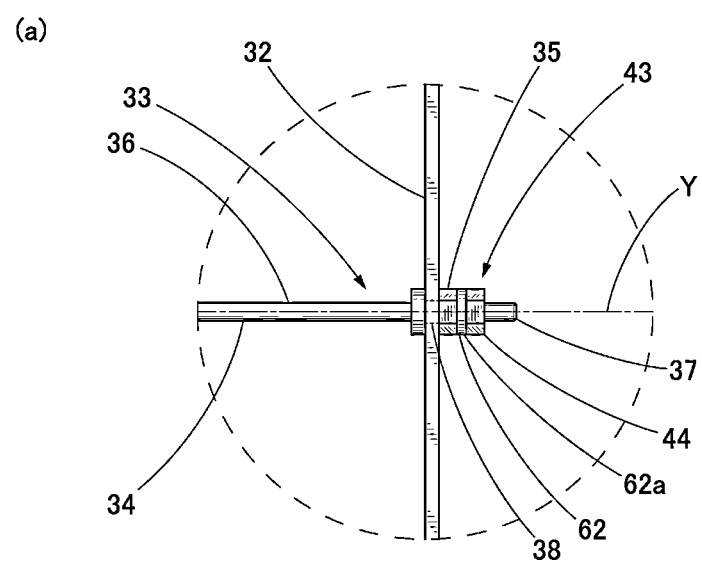
FIG. 9A is an explanatory diagram for explaining adjustments of a movable mass of a displacer assembly of the third embodiment of the present invention, in which a thinner washer 62a is used.
FIG. 9B is an explanatory diagram for explaining adjustments of the movable mass of the displacer assembly of the third embodiment of the present invention, in which a washer 62b with a medium thickness is used.
FIG. 9C is an explanatory diagram for explaining adjustments of the movable mass of the displacer assembly of the third embodiment of the present invention, in which a thicker washer 62c is used.
Figure 9:
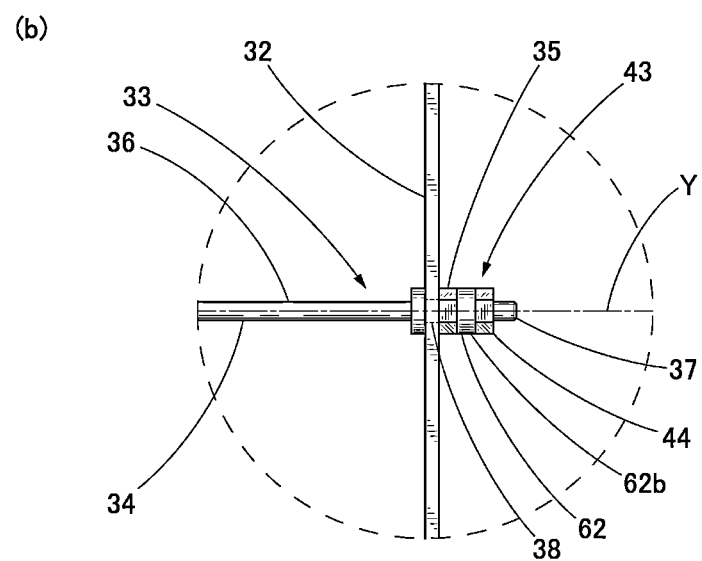
Figure 9:
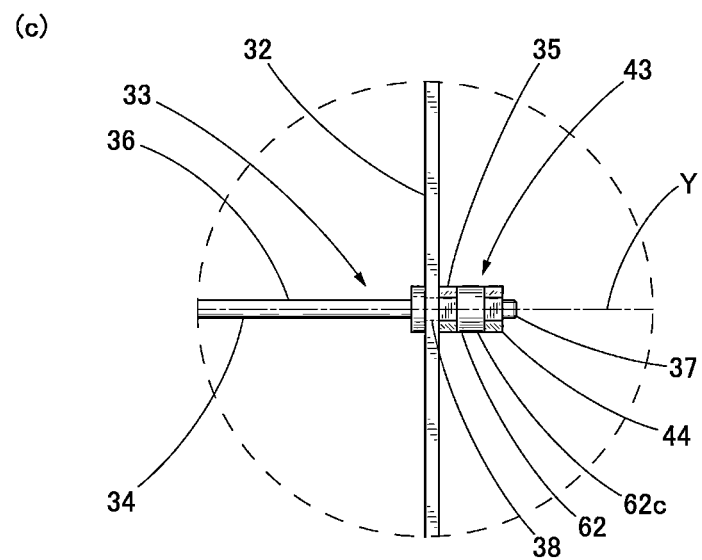
Figure 10:
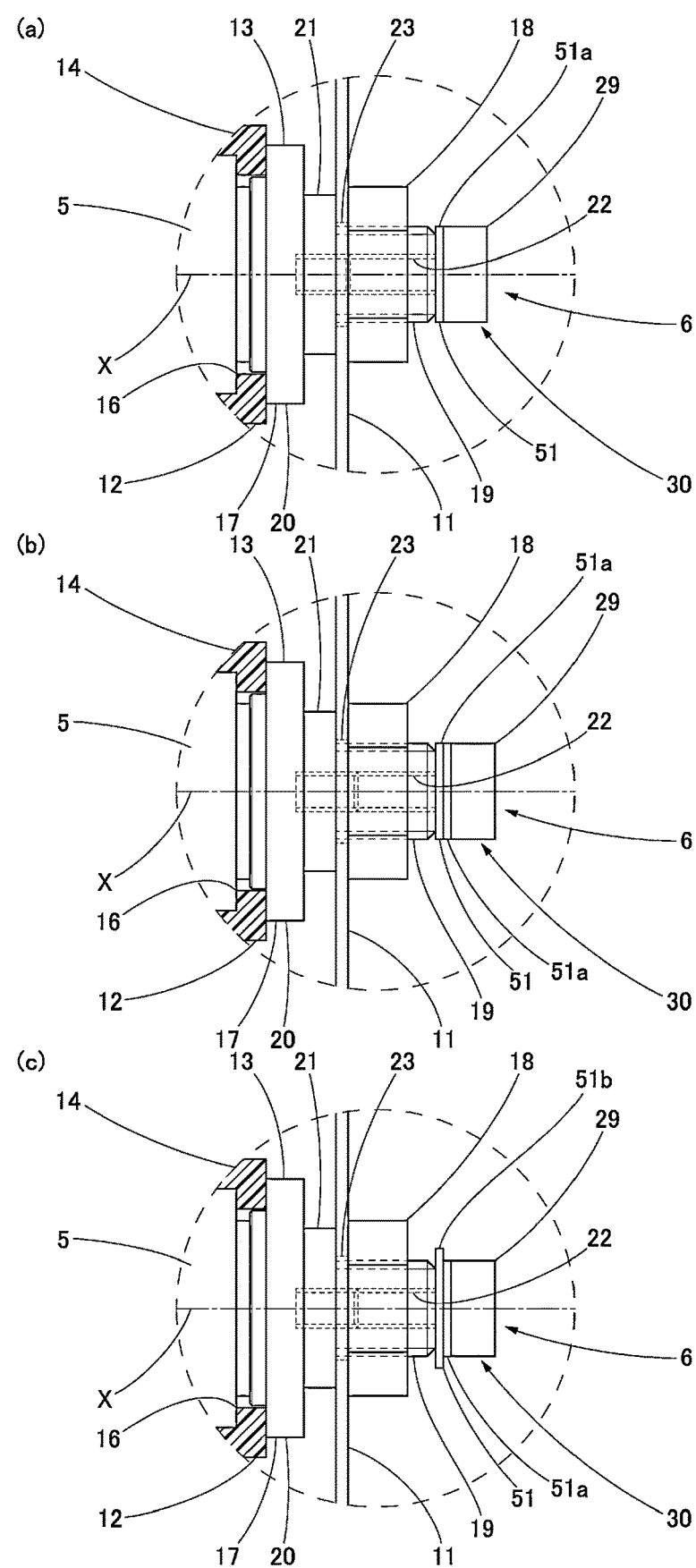
FIG. 10A is an explanatory diagram for explaining adjustments of a movable mass of a piston assembly in a free-piston Stirling engine of a fourth embodiment of the present invention, in which a washer 51a with a small diameter is used.
FIG. 10B is an explanatory diagram for explaining adjustments of the movable mass of the piston assembly in the free-piston Stirling engine of the fourth embodiment of the present invention, in which 2 pieces of the washer 51a with a small diameter are used.
FIG. 10C is an explanatory diagram for explaining adjustments of the movable mass of the piston assembly in the free-piston Stirling engine of the fourth embodiment of the present invention, in which the washer 51a with a small diameter and a washer 51b with a large diameter are used.
Figure 11:
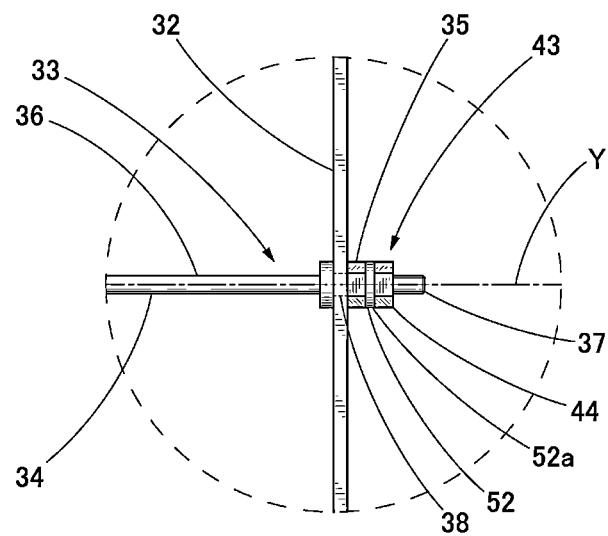
FIG. 11A is an explanatory diagram for explaining adjustments of a movable mass of a displacer assembly of the fourth embodiment of the present invention, in which a washer 52a with a small diameter is used.
FIG. 11B is an explanatory diagram for explaining adjustments of the movable mass of the displacer assembly of the fourth embodiment of the present invention, in which 2 pieces of the washer 52a with a small diameter are used.
FIG. 11C is an explanatory diagram for explaining adjustments of the movable mass of the displacer assembly of the fourth embodiment of the present invention, in which the washer 52a with a small diameter and a washer 52b with a large diameter are used.
Figure 11:
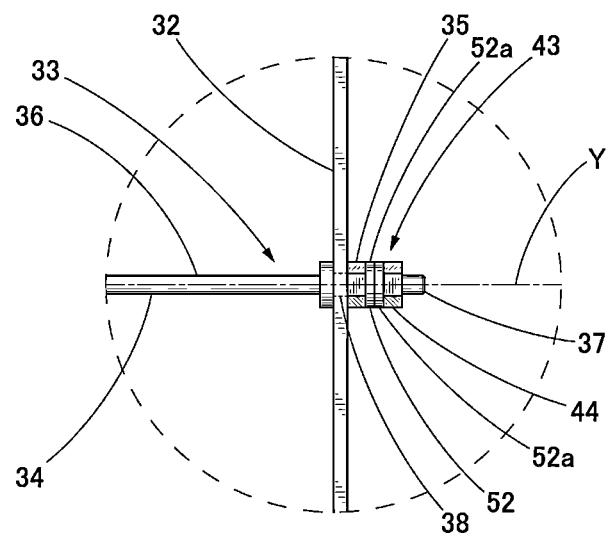
Figure 11:
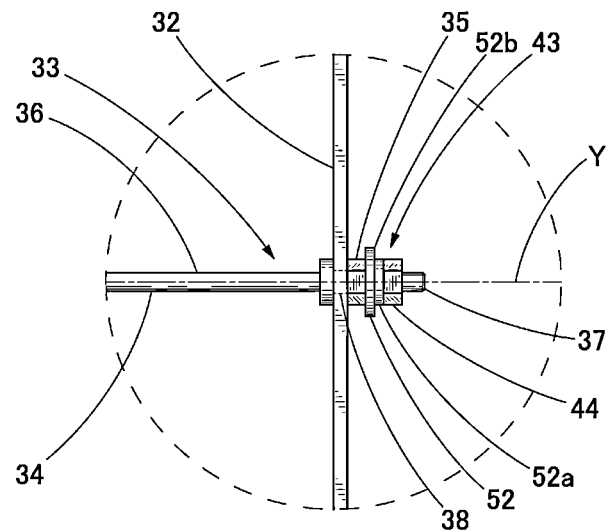

A first embodiment of the present invention is described hereunder with reference to FIGS. 1 through 5C. A numerical symbol "1" represents a free-piston Stirling refrigerator as a free-piston Stirling engines of the present invention (which may be abbreviated as "Stirling refrigerator" hereunder). In this example, for ease of explanation, a γ-type Stirling refrigerator is shown as an example of the Stirling refrigerator 1, but other types, such as a β-type, may also be used. The Stirling refrigerator 1, in a sealed casing 2, comprises: a first cylinder 3, a second cylinder 4, a piston assembly 6 having a piston 5 as a reciprocating body capable of reciprocating inside the first cylinder 3 along a central axis direction X thereof, and a displacer assembly 8 having a displacer 7 as a reciprocating body capable of reciprocating inside the second cylinder 4 along a central axis direction Y thereof.

The casing 2 has a cylindrical portion 9 and a trunk portion 10. The tip end side of the cylindrical portion 9 serves as a heat absorption portion 9C, the base end side of the cylindrical portion 9 serves as a heat discharge portion 9H. In the cylindrical portion 9, there are provided the second cylinder 4, part of the displacer assembly 8, and a heat absorption-side heat exchanger (not shown), a regenerator (not shown), and a heat discharge-side heat exchanger (not shown). Further, in the trunk portion 10, there are provided the first cylinder 3, the piston assembly 6, part of the displacer assembly 8, and a stator of a linear motor (not shown).

The piston assembly 6 is described in detail hereunder. The piston assembly 6 is configured to have the piston 5, a first leaf spring 11 as an elastic body for controlling reciprocating motion of the piston 5 inside the first cylinder 3, a mover 12 of the linear motor for providing a driving force to the piston 5, and a connection body 13 for fixing the piston 5 and the mover 12 to the first leaf spring 11. The piston 5 is formed in a cylindrical shape. A female screw (not shown) is formed on the base end side of the piston 5. The mover 12 is configured to have a cylindrical frame 14 made of non-magnetic synthetic resin and a cylindrical permanent magnet 15 fixed to the frame 14. A circular through hole 16 is formed on the base end side of the frame 14. The inner diameter of the through hole 16 is formed smaller than the outer diameter of the piston 5. The connection body 13 is configured to have a connection main body 17 and a nut 18. The connection main body 17 is configured to have a first male screw (not shown), a second male screw 19, a large diameter portion 20, a small diameter portion 21, and a female screw 22. The first male screw is configured to be able to be screwed to the female screw (not shown) of the piston 5 through the through hole 16. Namely, the outer diameter of the first male screw is formed smaller than the inner diameter of the through hole 16. On the other hand, the outer diameter of the large-diameter portion 20 is formed larger than the inner diameter of the through hole 16. Consequently, the mover 12 is sandwiched by the piston 5 and the connection main body 17 upon screwing the first male screw of the connection main body 17 to the female screw of the piston 5 through the through hole 16. While a central through hole 23 is formed in the center of the first leaf spring 11, a plurality of outer circumferential through holes 24 are formed on an outer circumferential portion thereof. The inner diameter of the central through hole 23 is larger than the outer diameter of the second male screw 19, and is formed smaller than the width across flats of the nut 18. Accordingly, the second male screw 19 can be inserted through the central through hole 23 of the first leaf spring 11. Further, in a state where the second male screw 19 is inserted through the central through hole 23, the first leaf spring 11 is sandwiched by the connection main body 17 and the nut 18 upon screwing the nut 18 to the second male screw 19. The piston assembly 6 is configured in the above-described manner.

The first leaf spring 11 is supported by a support arm portion 25 as a support body. In detail, the outer circumferential portion of the first leaf spring 11 is sandwiched by the support arm portion 25 and screws 26 as a result of inserting the screw 26 through the outer circumferential through hole 24 of the first leaf spring 11 and allowing them to be screwed to the female screws 27 of the support arm portion 25. Then, the support arm portion 25 is formed integrally with the first cylinder 3 through a flange portion 28. Accordingly, the positional relation of the support arm portion 25 with respect to the first cylinder 3 is fixed. This means that the positional relation between the first cylinder 3 and the outer circumferential portion of the first leaf spring 11 supported by the support arm portion 25 is fixed. Namely, the outer circumferential portion of the first leaf spring 11 serves as a fixation portion that does not move, and the central portion of the first leaf spring 11 serves as a movable portion that moves in conjunction with the reciprocating motion of the piston 5.

On a side of the connection main body 17 that is opposite to the piston 5, there is formed the female screw 22 coaxial with the second male screw 19, the connection main body 17 composing the piston assembly 6. Namely, on the side of the connection main body 17 that is opposite to the piston 5, the second male screw 19 is formed outside, and the female screw 22 is formed inside. The tip end side of the connection main body 17 having the female screw 22 is a female screw member. A bolt 29 as a male screw member is to be screwed to the female screw 22. Further, an attachment portion 30 is composed of the female screw member having the female screw 22 and the bolt 29 serving as the male screw member. Namely, the attachment portion 30 is provided on a side of the first leaf spring 11 that is opposite to the piston 5. Further, by screwing together the female screw 22 and the bolt 29, a washer 31 as a weight body can be sandwiched between the connection main body 17 and the bolt 29.

Next, described is a method for adjusting a resonance frequency fp of the piston assembly 6 in this embodiment. At first, a spring constant kp is measured by attaching the outer circumferential portion of the first leaf spring 11 to a measurement jig (not shown), and applying a stress to the first leaf spring 11. Here, the measurement jig is of a similar positional relation as the support arm portion 25. Further, the measurement of the spring constant kp is not performed with regard to each first leaf spring 11, but performed per production lot. In general, a resonance frequency f in a vibration system composed of a reciprocating object and an elastic body connected to such object is expressed by the following formula.

$$f = (1/2\pi)\sqrt{(k/m)}$$

In this formula, k is a spring constant of the elastic body, and m is a movable mass. Thus, a target resonance frequency fpt of the piston assembly 6 is expressed by the following formula.

$$fpt = (1/2\pi)\sqrt{(kp/mp)}$$

Since the target resonance frequency fpt and the spring constant kp of the first leaf spring 11 are known, the movable mass mp of the piston assembly 6 can be calculated. Here, the movable mass mp is a sum of a mass m5 of the piston 5, a mass m12 of the mover 12, a mass m17 of the connection main body 17, a mass m18 of the nut 18, a mass m29 of the bolt 29, a mass m11 of the first leaf spring 11 excluding the outer circumferential portion thereof, and a mass31 of n pieces of the washer 31. Here, m5, m12, m17, m18, m29, and m31 are measured in advance. However, the measurement of these masses is not performed with regard to each member, but performed per production lot. Further, m11 is a calculated value. Thus, the above formula can be converted as follows.

$$fpt = (1/2\pi)\sqrt{(kp/(m_5 + m_{12} + m_{17} + m_{18} + m_{29} + m_{11} + nm_{31}))}$$

Here, in this example, while n=2, as shown in FIG. 4B, serving as a reference, the value of n varies depending on the value of kp. The piston 5, the mover 12, and the connection main body 17 that occupy a large portion of the movable mass mp inherently have small tolerances as they are manufactured with high precisions. Further, although the nut 18, the bolt 29, and the washer 31 are standardized products, since their masses are small, the differences in mass have a relatively small impact on the resonance frequency fp. In terms of calculation, this allows the resonance frequency fp of the piston assembly 6 to be brought closer to the target resonance frequency fpt, but in practice, the resonance frequency fp sometimes deviates from the target resonance frequency fpt by an allowable range or more. As such, when the resonance frequency fp deviates from the target resonance frequency fpt by an allowable range or more, the deviation can be addressed by increasing or decreasing the number of washers 31. When the value of the movable mass mp needs to be decreased, for example, as shown in FIG. 4A, the number of the washers 31 is reduced to one. Further, when the value of the movable mass mp needs to be increased, for example, as shown in FIG. 4C, the number of the washers 31 is increased to three. In this way, by adjusting the number of the washers 31 that are to be sandwiched when screwing the bolt 29 to the female screw 22, the value of the movable mass mp is adjusted, which allows the resonance frequency fp of the piston assembly 6 to be brought closer to the target resonance frequency fpt. Here, by employing a thinner washer 31, the step of adjusting the movable mass mp can be carried out finely.

Here, in the case of the free-piston Stirling refrigerator 1, since the coaxiality of the piston 5 and the first cylinder 3 is required to be of a high precision, once the piston assembly 6 has been disassembled for the purpose of adjusting the movable mass mp, readjustment of the coaxiality of the piston 5 and the first cylinder 3 will be necessary when reassembling the piston assembly 6. However, as described above, since the attachment portion 30 is provided on the side of the first leaf spring 11 that is opposite to the piston 5, even when the piston 5 is inserted in the first cylinder 3 with the piston assembly 6 being supported by the support arm portion 25, the movable mass mp can be adjusted by removing only the bolt 29 from the piston assembly 6 and adjusting the number of the washers 31. Namely, the resonance frequency fp can be easily brought closer to the target resonance frequency fpt without impairing the coaxiality of the piston 5 and the first cylinder 3.

The displacer assembly 8 is described in detail hereunder. The displacer assembly 8 is configured to have the displacer 7, a second leaf spring 32 serving as an elastic body for controlling the reciprocating motion of the displacer 7 inside the second cylinder 4, and a connection body 33 for fixing the displacer 7 to the second leaf spring 32. The displacer 7 is formed in a cylindrical shape. Further, the connection body 33 is configured to have a rod 34 and a first nut 35. The rod 34 is configured to have a rod main body 36 having a round bar shape and a male screw 37 provided on a side of the rod main body 36 that is opposite to the displacer 7. The rod main body 36 is coaxially connected to the displacer 7. The outer diameter of the male screw 37 is smaller than the outer diameter of the end portion of the rod main body 36 that is opposite to the displacer 7. A central through hole 38 is formed in the center of the second leaf spring 32, and a plurality of outer circumferential through holes 39 are formed on the outer circumferential portion of the second leaf spring 32. The inner diameter of the central through hole 38 is larger than the outer diameter of the male screw 37, and is formed smaller than the outer diameter of the end portion of the rod main body 36 that is opposite to the displacer 7 and the width across flats of the first nut 35. Accordingly, the male screw 37 can be inserted through the central through hole 38 of the second leaf spring 32. In a state where the male screw 37 is inserted through the central through hole 38, the second leaf spring 32 is sandwiched by the rod main body 36 and first nut 35 as a result of screwing the first nut 35 to the male screw 37. The displacer assembly 8 is configured in the above-described manner.

The second leaf spring 32 is supported by a support arm portion 40 serving as a support body. In detail, the outer circumferential portion of the second leaf spring 32 is sandwiched by the support arm portion 40 and screws 41 as a result of inserting the screws 41 through the outer circumferential through holes 39 of the second leaf spring 32 and allowing them to be screwed to female screws 42 of the support arm portion 40. Then, the support arm portion 40 is positioned and fixed inside the trunk portion 10 of the casing 2. The second cylinder 4 is positioned and fixed inside the cylindrical portion 9 of the casing 2. Thus, the positional relation of the support arm portion 40 to the second cylinder 4 is fixed inside the casing 2. This means that the positional relation between the outer circumferential portion of the second leaf sprig 32 supported by the support arm portion 40 and the second cylinder 4 is fixed. Namely, the outer circumferential portion of the second leaf spring 32 serves as a fixation portion that does not move, and the central portion of the second leaf spring 32 serves as a movable portion that moves in conjunction with the reciprocating motion of the displacer 7.

The tip end side of the male screw 37 of the rod 34 composing the displacer assembly 8 is a male screw member composing part of an attachment portion 43. A second nut 44 serves as a female screw member composing part of the attachment portion 43, and the second nut 44 is screwed to the male screw 37. Namely, the attachment portion 43 is provided on a side of the second leaf spring 32 that is opposite to the displacer 7. Further, a washer 45 serving as a weight body can be sandwiched between the first nut 35 and the second nut 44 by screwing the male screw member having the male screw 37 to the second nut 44 serving as the female screw member.

Next, described hereunder is a method for adjusting a resonance frequency fd of the displacer assembly 8 in this embodiment. At first, a spring constant kd is measured by attaching the outer circumferential portion of the second leaf spring 32 to a measurement jig (not shown), and applying a stress to the second leaf spring 32. Here, the measurement jig is of a similar positional relation as the support arm portion 40. Further, the measurement of the spring constant kd is not performed with regard to each second leaf spring 32, but performed per production lot. As is the case with the piston assembly 6, a target resonance frequency fdt of the displacer assembly 8 is expressed by the following formula.

$$fdt = (1/2\pi)\sqrt{(kd/md)}$$

Since the target resonance frequency fdt and the spring constant kd of the second leaf spring 32 are known, the movable mass md of the displacer assembly 8 can be calculated. Here, the movable mass md is a sum of a mass $m_7$ of the displacer 7, a mass $m_{34}$ of the rod 34, a mass $m_{35}$ of the first nut 35, a mass $m_{44}$ of the second nut 44, a mass $m_{32}$ of the second leaf spring 32 excluding the outer circumferential portion thereof, and a mass $m_{45}$ of n pieces of the washer 45. Here, $m_7$, $m_{34}$, $m_{35}$, $m_{44}$, and $m_{45}$ are measured in advance. However, the measurement of these masses is not performed with regard to each member, but performed per production lot. Further, m32 is a calculated value. Thus, the above formula can be converted as follows.

$$fdt = (1/2\pi)\sqrt{(kd(m_7 + m_{34} + m_{35} + m_{44} + m_{32} + nm_{45}))}$$

Here, in this example, while n=2 as is shown in FIG. 5B serving as a reference, the value of n varies depending on the value of kd. The displacer 7 and the rod 34, which occupy a large portion of the movable mass md, are manufactured with high precisions, so that the tolerances are inherently small. Further, the first nut 35, the second nut 44, and the washer 45 are standardized products, but the masses thereof are small, so that the impact on the resonance frequency fd due to the mass difference is relatively small. In terms of calculation, this allows the resonance frequency fd of the displacer assembly 8 to be brought closer to the target resonance frequency fdt, but in practice, the resonance frequency fd sometimes deviates from the target resonance frequency fdt by an allowable range or more. As such, when the resonance frequency fd deviates from the target resonance frequency fdt by an allowable range or more, the deviation can be addressed by increasing or decreasing the number of the washers 45. When the value of the movable mass md needs to be decreased, for example, as shown in FIG. 5A, the number of the washers 45 is reduced to one. Further, when the value of the movable mass md needs to be increased, for example, as shown in FIG. 5C, the number of the washers 45 is increased to three. In this way, by adjusting the number of the washers 45 that are to be sandwiched when screwing the second nut 44 to the male screw 37, the value of the movable mass md is adjusted, which allows the resonance frequency fd of the displacer assembly 8 to be brought closer to the target resonance frequency fdt. Here, by employing a thinner washer 45, the step of adjusting the movable mass md can be carried out finely.

Here, in the case of the free-piston Stirling refrigerator 1, since the coaxiality of the displacer 7 and the second cylinder 4 is required to be of a high precision, once the displacer assembly 8 has been disassembled for the purpose of adjusting the movable mass md, readjustment of the coaxiality of the displacer 7 and the second cylinder 4 will be necessary when reassembling the displacer assembly 8. However, as described above, since the attachment portion 43 is provided on the side of the second leaf spring 32 that is opposite to the displacer 7, even when the displacer 7 is inserted in the second cylinder 4 with the displacer assembly 8 being supported by the support arm portion 40, the movable mass md can be adjusted by removing only the second nut 44 from the displacer assembly 8 and adjusting the number of the washers 45. Namely, the resonance frequency fd can be easily brought closer to the target resonance frequency fdt without impairing the coaxiality of the displacer 7 and the second cylinder 4.

In this way, by adjusting the number of the washers 31 to be attached to the piston assembly 6 and the number of the washers 45 to be attached to the displacer assembly 8, the resonance frequency fp of the piston assembly 6 can be brought closer to the target resonance frequency fpt and the resonance frequency fd of the displacer assembly 8 can be brought closer to the target resonance frequency fdt. The attachment portion 30 is provided on the side of the first leaf spring 11 that is opposite to the piston 5, making it possible to easily adjust the resonance frequency fp even in a state where the piston assembly 6 is supported by the support arm portion 25 and the piston 5 is inserted in the first cylinder 3. Similarly, the attachment portion 43 is provided on the side of the second leaf spring 32 that is opposite to the displacer 7, making it possible to easily adjust the resonance frequency fd even in a state where the displacer assembly 8 is supported by the support arm portion 40 and the displacer 7 is inserted in the second cylinder 4. Accordingly, since it is not necessary to disassemble the piston assembly 6 after measuring the resonance frequency fp of the piston assembly 6 as in the conventional case, not only the risk of component damage associated with assembly and disassembly (specifically, the risks of, for example, stripping the screw threads, and having a component collide with other objects and causing scratches) can be reduced, but also the movable mass mp can be adjusted without impairing the coaxiality of the piston 5 and the first cylinder 3 that has once already been adjusted. Similarly, since it is not necessary to disassemble the displacer assembly 8 after measuring the resonance frequency fd of the displacer assembly 8, not only the risk of component damage associated with assembly and disassembly can be reduced, but also the movable mass md can be adjusted without impairing the coaxiality of the displacer 7 and the second cylinder 4 that has once already been adjusted. Further, since the attachment portions 30, 43 are provided coaxially with the piston assembly 6 and the displacer assembly 8, respectively, the washers 31, 45 serving as weight bodies can be coaxially attached to the attachment portions 30, 43, which leads to a favorable weight balance between the piston assembly 6 and the displacer assembly 8 and thereby allows the reciprocating motions of the piston 5 and the displacer 7 to be performed in a well-balanced manner. In addition, since the washers 31, 45 are used as weight bodies, the resonance frequency fp of the piston assembly 6 and the resonance frequency fd of the displacer assembly 8 can be easily adjusted by adjusting the numbers of the washers 31, 45 that are to be sandwiched.

Next, a second embodiment of the present invention is described with reference to FIGS. 1 to 3C, 6A through 7C. Here, the structure of the piston assembly 6 and the displacer assembly 8 is the same as that described in the first embodiment, and thus the description thereof is omitted. Described hereunder is the adjustment of the movable masses mp, md.

On a side of the connection main body 17 that is opposite to the piston 5, there is formed the female screw 22 coaxial with the second male screw 19, the connection main body 17 composing the piston assembly 6. Namely, on the side of the connection main body 17 that is opposite to the piston 5, the second male screw 19 is formed outside, and the female screw 22 is formed inside. The tip end side of the connection main body 17 having the female screw 22 is a female screw member. The bolt 29 as a male screw member is to be screwed to the female screw 22. Further, an attachment portion 30 is composed of the female screw 22 and the bolt 29. Namely, the attachment portion 30 is provided on a side of the first leaf spring 11 that is opposite to the piston 5. Further, by screwing together the female screw member having the female screw 22 and the bolt 29 as the male screw member, a washer 51 serving as a weight body can be sandwiched between the connection main body 17 and the bolt 29. Here, this washer 51 is any of multiple types of washers with different diameters (51a, 51b, 51c, ...).

Next, described is a method for adjusting a resonance frequency fp of the piston assembly 6 in this embodiment. At first, a spring constant kp is measured by attaching the outer circumferential portion of the first leaf spring 11 to a measurement jig (not shown), and applying a stress to the first leaf spring 11. Here, the measurement jig is of a similar positional relation as the support arm portion 25. Further, the measurement of the spring constant kp is not performed with regard to each first leaf spring 11, but performed per production lot. In general, a resonance frequency f in a vibration system composed of a reciprocating object and an elastic body connected to such object is expressed by the following formula.

$$f = (1/2\pi)\sqrt{(k/m)}$$

In this formula, k is a spring constant of the elastic body, and m is a movable mass. Thus, a target resonance frequency fpt of the piston assembly 6 is expressed by the following formula.

$$fpt = (1/2\pi)\sqrt{(kp/mp)}$$

Since the target resonance frequency fpt and the spring constant kp of the first leaf spring 11 are known, the movable mass mp of the piston assembly 6 can be calculated. Here, the movable mass mp is a sum of the mass m5 of the piston 5, the mass $m_{12}$ of the mover 12, the mass $m_{17}$ of the connection main body 17, the mass $m_{18}$ of the nut 18, the mass $m_{29}$ of the bolt 29, the mass $m_{11}$ of the first leaf spring 11 excluding the outer circumferential portion thereof, and a mass $m_{51}$ of the washer 51. Here, $m_5$, $m_{12}$, $m_{17}$, $m_{18}$, $m_{29}$, and $m_{51}$ are measured in advance. However, the measurement of these masses is not performed with regard to each member, but performed per production lot. Further, $m_{11}$ is a calculated value. Thus, the above formula can be converted as follows.

$$fpt = (1/2\pi)\sqrt{(kp/(m_5 + m_{12} + m_{17} + m_{18} + m_{29} + m_{11} + m_{51}))}$$

Here, in this example, while the washer 51 is the washer 51b having a medium diameter, as is shown in FIG. 6B serving as a reference, the selection of any of the washers 51a, 51b, 51c, ... varies depending on the value of kp. The piston 5, the mover 12, and the connection main body 17 that occupy a large portion of the movable mass mp inherently have small tolerances as they are manufactured with high precisions. Further, although the nut 18, the bolt 29, and the washer 51 are standardized products, since their masses are small, the differences in mass have a relatively small impact on the resonance frequency fp. In terms of calculation, this allows the resonance frequency fp of the piston assembly 6 to be brought closer to the target resonance frequency fpt, but in practice, the resonance frequency fp sometimes deviates from the target resonance frequency fpt by an allowable range or more. As such, when the resonance frequency fp deviates from the target resonance frequency fpt by an allowable range or more, the deviation can be addressed by changing the type of the washer 51 to be attached. If there is a need to reduce the value of the movable mass mp, the washer 51 is changed to the one having a smaller diameter (51a) as is shown in FIG. 6A, for example. Further, if there is a need to increase the value of the movable mass mp, the washer 51 is changed to one having a larger diameter (51c) as is shown in FIG. 6C, for example. In this way, by selecting the type of the washer 51 that is to be sandwiched when screwing the bolt 29 to the female screw 22, the value of the movable mass mp is adjusted, which allows the resonance frequency fp of the piston assembly 6 to be brought closer to the target resonance frequency fpt. Here, by reducing the difference in diameter between the washers 51 (51a, 51b, 51c, ...), the step of adjusting the movable mass mp can be carried out finely.

Here, in the case of the free-piston Stirling refrigerator 1, since the coaxiality of the piston 5 and the first cylinder 3 is required to be of a high precision, if the piston assembly 6 is disassembled once for adjustment of the movable mass mp, readjustment of the coaxiality of the piston 5 and the first cylinder 3 is necessary when reassembling the piston assembly 6. However, as described above, since the attachment portion 30 is provided on the side of the first leaf spring 11 that is opposite to the piston 5, even when the piston 5 is inserted in the first cylinder 3 with the piston assembly 6 being supported by the support arm portion 25, the movable mass mp can be adjusted by appropriately selecting the type of the washer 51 (51a, 51b, 51c, ... ) to be attached. Namely, the resonance frequency fp can be easily brought closer to the target resonance frequency fpt without impairing the coaxiality of the piston 5 and the first cylinder 3.

The tip end side of the male screw 37 of the rod 34 composing the displacer assembly 8 is the male screw member composing part of the attachment portion 43. The second nut 44 serves as the female screw member composing part of the attachment portion 43, and the second nut 44 is screwed to the male screw 37. Namely, the attachment portion 43 is provided on the side of the second leaf spring 32 that is opposite to the displacer 7. Further, a washer 52 serving as a weight body can be sandwiched between the first nut 35 and the second nut 44 by screwing the male screw member having the male screw 37 to the second nut 44 serving as the female screw member. Here, this washer 52 is any of multiple types of washers with different diameters (52a, 52b, 52c, ... ).

Next, described hereunder is a method for adjusting the resonance frequency fd of the displacer assembly 8 in this embodiment. At first, a spring constant kd is measured by attaching the outer circumferential portion of the second leaf spring 32 to a measurement jig (not shown), and applying a stress to the second leaf spring 32. Here, the measurement jig is of a similar positional relation as the support arm portion 40. Further, the measurement of the spring constant kd is not performed with regard to each second leaf spring 32, but performed per production lot. As is the case with the piston assembly 6, a target resonance frequency fdt of the displacer assembly 8 is expressed by the following formula.

$$fdt = (1/2\pi)\sqrt{(kd/md)}$$

Since the target resonance frequency fdt and the spring constant kd of the second leaf spring 32 are known, the movable mass md of the displacer assembly 8 can be calculated. Here, the movable mass md is a sum of the mass my of the displacer 7, the mass $m_{34}$ of the rod 34, the mass $m_{35}$ of the first nut 35, the mass $m_{44}$ of the second nut 44, the mass $m_{32}$ of the second leaf spring 32 excluding the outer circumferential portion thereof, and a mass $m_{52}$ of the washer 52. Here, $m_7$, $m_{34}$, $m_{35}$, $m_{44}$, and $m_{52}$ are measured in advance. However, the measurement of these masses is not performed with regard to each member, but performed per production lot. Further, $m_{32}$ is a calculated value. Thus, the above formula can be converted as follows.

$$fdt = (1/2\pi)\sqrt{(kd/(m_7 + m_{34} + m_{35} + m_{44} + m_{32} + m_{52}))}$$

Here, in this example, while the washer 52 is the washer 52b having a medium diameter as is shown in FIG. 7B serving as a reference, the selection of any of the washers 52a, 52b, 52c, ... varies depending on the value of kp. The displacer 7 and the rod 34, which occupy a large portion of the movable mass md, are manufactured with high precisions, so that the tolerances are inherently small. Further, the first nut 35, the second nut 44, and the washer 52 are standardized products, but the masses thereof are small, so that the impact on the resonance frequency fd due to the mass difference is relatively small. In terms of calculation, this allows the resonance frequency fd of the displacer assembly 8 to be brought closer to the target resonance frequency fdt, but in practice, the resonance frequency fd sometimes deviates from the target resonance frequency fdt by an allowable range or more. As such, when the resonance frequency fd deviates from the target resonance frequency fdt by an allowable range or more, the deviation can be addressed by changing the type of the washer 52 to be attached. When the value of the movable mass md needs to be decreased, the washer 52 is changed to one having a smaller diameter (52a) as is shown in FIG. 7A, for example. Further, when the value of the movable mass md needs to be increased, the washer 52 is changed to one having a larger diameter (52c) as is shown in FIG. 7C, for example. In this way, by selecting the type of the washer 52 that is to be sandwiched when screwing the second nut 44 to the male screw 37, the value of the movable mass md is adjusted, which allows the resonance frequency fd of the displacer assembly 8 to be brought closer to the target resonance frequency fdt. Here, by reducing the difference in diameter between the washers 52 (52a, 52b, 52c, ... ), the step of adjusting the movable mass md can be carried out finely.

Here, in the case of the free-piston Stirling refrigerator 1, since the coaxiality of the displacer 7 and the second cylinder 4 is required to be of a high precision, once the displacer assembly 8 has been disassembled for the purpose of adjusting the movable mass md, readjustment of the coaxiality of the displacer 7 and the second cylinder 4 will be necessary when reassembling the displacer assembly 8. However, as described above, since the attachment portion 43 is provided on the side of the second leaf spring 32 that is opposite to the displacer 7, even when the displacer 7 is inserted in the second cylinder 4 with the displacer assembly 8 being supported by the support arm portion 40, the movable mass md can be adjusted by removing only the second nut 44 from the displacer assembly 8 and by appropriately selecting the type of the washer 52 (52a, 52b, 52c, ... ) to be attached. Namely, the resonance frequency fd is allowed to be easily brought closer to the target resonance frequency fdt without impairing the coaxiality of the displacer 7 and the second cylinder 4.

In this way, by selecting the type of washer 51 (51a, 51b, 51c, ... ) attached to the piston assembly 6, and the type of washer 52 (52a, 52b, 52c, ... ) attached to the displacer assembly 8, the resonance frequency fp of the piston assembly 6 can be brought closer to the target resonance frequency fpt and the resonance frequency fd of the displacer assembly 8 can be brought closer to the target resonance frequency fdt. The attachment portion 30 is provided on the side of the first leaf spring 11 that is opposite to the piston 5, making it possible to easily adjust the resonance frequency fp even in a state where the piston assembly 6 is supported by the support arm portion 25 and the piston 5 is inserted in the first cylinder 3. Similarly, the attachment portion 43 is provided on the side of the second leaf spring 32 that is opposite to the displacer 7, making it possible to easily adjust the resonance frequency fd even in a state where the displacer assembly 8 is supported by the support arm portion 40 and the displacer 7 is inserted in the second cylinder 4. Accordingly, since it is not necessary to disassemble the piston assembly 6 after measuring the resonance frequency fp of the piston assembly 6 as in the conventional case, not only the risk of component damage associated with assembly and disassembly (specifically, the risks of, for example, stripping the screw threads, and having a component collide with other objects and causing scratches) can be reduced, but also the movable mass mp can be adjusted without impairing the coaxiality of the piston 5 and the first cylinder 3 that has once already been adjusted. Similarly, since it is not necessary to disassemble the displacer assembly 8 after measuring the resonance frequency fd of the displacer assembly 8, not only the risk of component damage associated with assembly and disassembly can be reduced, but also the movable mass md can be adjusted without impairing the coaxiality of the displacer 7 and the second cylinder 4 that has once already been adjusted. Further, since the attachment portions 30, 43 are provided coaxially with the piston assembly 6 and the displacer assembly 8, respectively, the washers 31, 45 serving as weight bodies can be coaxially attached to the attachment portions 30, 43, which leads to a favorable weight balance between the piston assembly 6 and the displacer assembly 8 and thereby allows the reciprocating motions of the piston 5 and the displacer 7 to be performed in a well-balanced manner. In addition, the washers 51, 52 are used as weight bodies, and any of the washers having different diameters (51a, 51b, 51c, . . . , 52a, 52b, 52c, . . . ) is selected and sandwiched, making it possible to easily adjust the resonance frequency fp of the piston assembly 6 and the resonance frequency fd of the displacer assembly 8.

Next, a third embodiment of the present invention is described with reference to FIGS. 1 to 3, 8A through 9C. Here, the structure of the piston assembly 6 and the displacer assembly 8 is the same as that described in the first and second embodiments, and thus the description thereof is omitted. Described hereunder is the adjustment of the movable masses mp, md.

On a side of the connection main body 17 that is opposite to the piston 5, there is formed the female screw 22 coaxial with the second male screw 19, the connection main body 17 composing the piston assembly 6. Namely, on the side of the connection main body 17 that is opposite to the piston 5, the second male screw 19 is formed outside, and the female screw 22 is formed inside. The tip end side of the connection main body 17 having the female screw 22 is a female screw member. A bolt 29 as a male screw member is to be screwed to the female screw 22. Further, an attachment portion 30 is composed of the female screw member having the female screw 22 and a bolt 29 as the male screw member. Namely, the attachment portion 30 is provided on a side of the first leaf spring 11 that is opposite to the piston 5. Further, by screwing together the female screw 22 and the bolt 29, a washer 61 serving as a weight body can be sandwiched between the connection main body 17 and the bolt 29. Here, this washer 61 is any of multiple types of washers with different thicknesses (61a, 61b, 61c, . . . ).

Next, described is a method for adjusting a resonance frequency fp of the piston assembly 6 in this embodiment. At first, a spring constant kp is measured by attaching the outer circumferential portion of the first leaf spring 11 to a measurement jig (not shown), and applying a stress to the first leaf spring 11. Here, the measurement jig is of a similar positional relation as the support arm portion 25. Further, the measurement of the spring constant kp is not performed with regard to each first leaf spring 11, but performed per production lot. In general, a resonance frequency f in a vibration system composed of a reciprocating object and an elastic body connected to such object is expressed by the following formula.

$$f = (1/2\pi)\sqrt{(k/m)}$$

In this formula, k is a spring constant of the elastic body, and m is a movable mass. Thus, a target resonance frequency fpt of the piston assembly 6 is expressed by the following formula.

$$fpt = (1/2\pi)\sqrt{(kp/mp)}$$

Since the target resonance frequency fpt and the spring constant kp of the first leaf spring 11 are known, the movable mass mp of the piston assembly 6 can be calculated. Here, the movable mass mp is a sum of a mass $m_5$ of the piston 5, the mass $m_{12}$ of the mover 12, the mass $m_{17}$ of the connection main body 17, the mass $m_{18}$ of the nut 18, the mass $m_{29}$ of the bolt 29, the mass $m_{11}$ of the first leaf spring 11 excluding the outer circumferential portion thereof, and a mass $m_{61}$ of the washer 61. Here, $m_5$, $m_{12}$, $m_{17}$, $m_{18}$, $m_{29}$, and $m_{61}$ are measured in advance. However, the measurement of these masses is not performed with regard to each member, but performed per production lot. Further, $m_{11}$ is a calculated value. Thus, the above formula can be converted as follows.

$$fpt = (1/2\pi)\sqrt{(kp/(m_5 + m_{12} + m_{17} + m_{18} + m_{29} + m_{11} + m_{61}))}$$

Here, in this example, while the washer 61 is the washer 61b having a medium thickness, as is shown in FIG. 8B serving as a reference, the selection of any of the washers 61a, 61b, 61c, . . . varies depending on the value of kp. The piston 5, the mover 12, and the connection main body 17 that occupy a large portion of the movable mass mp inherently have small tolerances as they are manufactured with high precisions. Further, although the nut 18, the bolt 29, and the washer 61 are standardized products, since their masses are small, the differences in mass have a relatively small impact on the resonance frequency fp. In terms of calculation, this allows the resonance frequency fp of the piston assembly 6 to be brought closer to the target resonance frequency fpt, but in practice, the resonance frequency fp sometimes deviates from the target resonance frequency fpt by an allowable range or more. As such, when the resonance frequency fp deviates from the target resonance frequency fpt by an allowable range or more, the deviation can be addressed by changing the type of the washer 61 to be attached. If there is a need to reduce the value of the movable mass mp, the washer 61 is changed to a thinner washer (61a) as is shown in FIG. 8A, for example. Further, if there is a need to increase the value of the movable mass mp, the washer 61 is changed to a thicker washer (61c) as is shown in FIG. 8C, for example. In this way, by selecting the type of the washer 61 that is to be sandwiched when screwing the bolt 29 to the female screw 22, the value of the movable mass mp is adjusted, which allows the resonance frequency fp of the piston assembly 6 to be brought closer to the target resonance frequency fpt. Here, by reducing the difference in thickness between the washers 61 (61a, 61b, 61c, . . . ), the step of adjusting the movable mass mp can be carried out finely.

Here, in the case of the free-piston Stirling refrigerator 1, since the coaxiality of the piston 5 and the first cylinder 3 is required to be of a high precision, if the piston assembly 6 is disassembled once for adjustment of the movable mass mp, readjustment of the coaxiality of the piston 5 and the first cylinder 3 is necessary when reassembling the piston assembly 6. However, as described above, since the attachment portion 30 is provided on the side of the first leaf spring 11 that is opposite to the piston 5, even when the piston 5 is inserted in the first cylinder 3 with the piston assembly 6 being supported by the support arm portion 25, the movable mass mp can be adjusted by appropriately selecting the type of the washers 61 (61a, 61b, 61c, . . . ) to be attached. Namely, the resonance frequency fp can be easily brought closer to the target resonance frequency fpt without impairing the coaxiality of the piston 5 and the first cylinder 3.

The tip end side of the male screw 37 of the rod 34 composing the displacer assembly 8 is the male screw member composing part of the attachment portion 43. The second nut 44 serves as the female screw member composing part of the attachment portion 43, and the second nut 44 is screwed to the male screw 37. Namely, the attachment portion 43 is provided on the side of the second leaf spring 32 that is opposite to the displacer 7. Further, a washer 62 serving as a weight body can be sandwiched between the first nut 35 and the second nut 44 by screwing the male screw member having the male screw 37 to the second nut 44 serving as the female screw member. Here, this washer 62 is any of multiple types of washers with different thicknesses (62a, 62b, 62c, . . . ).

Next, described hereunder is a method for adjusting the resonance frequency fd of the displacer assembly 8 in this embodiment. At first, a spring constant kd is measured by attaching the outer circumferential portion of the second leaf spring 32 to a measurement jig (not shown), and applying a stress to the second leaf spring 32. Here, the measurement jig is of a similar positional relation as the support arm portion 40. Further, the measurement of the spring constant kd is not performed with regard to each second leaf spring 32, but performed per production lot. As is the case with the piston assembly 6, a target resonance frequency fdt of the displacer assembly 8 is expressed by the following formula.

$$fdt = (1/2\pi)\sqrt{(kd/md)}$$

Since the target resonance frequency fdt and the spring constant kd of the second leaf spring 32 are known, the movable mass md of the displacer assembly 8 can be calculated. Here, the movable mass md is a sum of the mass m7 of the displacer 7, the mass $m_{34}$ of the rod 34, the mass $m_{35}$ of the first nut 35, the mass $m_{44}$ of the second nut 44, the mass $m_{32}$ of the second leaf spring 32 excluding the outer circumferential portion thereof, and a mass $m_{62}$ of the washer 62. Here, $m_7$, $m_{34}$, $m_{35}$, $m_{44}$, and $m_{62}$ are measured in advance. However, the measurement of these masses is not performed with regard to each member, but performed per production lot. Further, $m_{32}$ is a calculated value. Thus, the above formula can be converted as follows.

$$fdt = (1/2\pi)\sqrt{(kd/(m_7 + m_{34} + m_{35} + m_{44} + m_{32} + m_{62}))}$$

Here, in this example, while the washer 62 is the washer 62b having a medium thickness as is shown in FIG. 9B serving as a reference, the selection of any of the washers 62a, 62b, 62c, . . . varies depending on the value of kd. The displacer 7 and the rod 34, which occupy a large portion of the movable mass md, are manufactured with high precisions, so that the tolerances are inherently small. Further, the first nut 35, the second nut 44, and the washer 62 are standardized products, but the masses thereof are small, so that the impact on the resonance frequency fd due to the mass difference is relatively small. In terms of calculation, this allows the resonance frequency fd of the displacer assembly 8 to be brought closer to the target resonance frequency fdt, but in practice, the resonance frequency fd sometimes deviates from the target resonance frequency fdt by an allowable range or more. As such, when the resonance frequency fd deviates from the target resonance frequency fdt by an allowable range or more, the deviation can be addressed by changing the type of the washer 62 to be attached. When the value of the movable mass md needs to be decreased, the washer 62 is changed to a thinner washer (62a) as is shown in FIG. 9A, for example. Further, when the value of the movable mass md needs to be increased, the washer 62 is changed to a thicker washer (62c) as is shown in FIG. 9C, for example. In this way, by selecting the type of the washer 62 that is to be sandwiched when screwing the second nut 44 to the male screw 37, the value of the movable mass md is adjusted, which allows the resonance frequency fd of the displacer assembly 8 to be brought closer to the target resonance frequency fdt. Here, by reducing the difference in thickness between the washers 62 (62a, 62b, 62c, . . . ), the step of adjusting the movable mass md can be carried out finely.

Here, in the case of the free-piston Stirling refrigerator 1, since the coaxiality of the displacer 7 and the second cylinder 4 is required to be of a high precision, once the displacer assembly 8 has been disassembled for the purpose of adjusting the movable mass md, readjustment of the coaxiality of the displacer 7 and the second cylinder 4 will be necessary when reassembling the displacer assembly 8. However, as described above, since the attachment portion 43 is provided on the side of the second leaf spring 32 that is opposite to the displacer 7, even when the displacer 7 is inserted in the second cylinder 4 with the displacer assembly 8 being supported by the support arm portion 40, the movable mass md can be adjusted by removing only the second nut 44 from the displacer assembly 8 and by appropriately selecting the type of the washer 62 (62a, 62b, 62c, . . . ) to be attached. Namely, the resonance frequency fd can be easily brought closer to the target resonance frequency fdt without impairing the coaxiality of the displacer 7 and the second cylinder 4.

In this way, by selecting the type of the washer 61 (61a, 61b, 61c, . . . ) attached to the piston assembly 6 and the type of the washer 62 (62a, 62b, 62c, . . . ) attached to the displacer assembly 8, the resonance frequency fp of the piston assembly 6 can be brought closer to the target resonance frequency fpt and the resonance frequency fd of the displacer assembly 8 can be brought closer to the target resonance frequency fdt. The attachment portion 30 is provided on the side of the first leaf spring 11 that is opposite to the piston 5, making it possible to easily adjust the resonance frequency fp even in a state where the piston assembly 6 is supported by the support arm portion 25 and the piston 5 is inserted in the first cylinder 3. Similarly, the attachment portion 43 is provided on the side of the second leaf spring 32 that is opposite to the displacer 7, making it possible to easily adjust the resonance frequency fd even in a state where the displacer assembly 8 is supported by the support arm portion 40 and the displacer 7 is inserted in the second cylinder 4. Accordingly, since it is not necessary to disassemble the piston assembly 6 after measuring the resonance frequency fp of the piston assembly 6 as in the conventional case, not only the risk of component damage associated with assembly and disassembly (specifically, the risks of, for example, stripping the screw threads, and having a component collide with other objects and causing scratches) can be reduced, but also the movable mass mp can be adjusted without impairing the coaxiality of the piston 5 and the first cylinder 3 that has once already been adjusted. Similarly, since it is not necessary to disassemble the displacer assembly 8 after measuring the resonance frequency fd of the displacer assembly 8, not only the risk of component damage associated with assembly and disassembly can be reduced, but also the movable mass md can be adjusted without impairing the coaxiality of the displacer 7 and the second cylinder 4 that has once already been adjusted. Further, since the attachment portions 30, 43 are provided coaxially with the piston assembly 6 and the displacer assembly 8, respectively, the washers 31, 45 serving as weight bodies can be coaxially attached to the attachment portions 30, 43, which leads to a favorable weight balance between the piston assembly 6 and the displacer assembly 8 and thereby allows the reciprocating motions of the piston 5 and the displacer 7 to be performed in a well-balanced manner. In addition, the washers 61, 62 are used as weight bodies: by selecting and sandwiching any of the washers having different thicknesses (61a, 61b, 61c, . . . , 62a, 62b, 62c, . . . ), it is possible to easily adjust the resonance frequency fp of the piston assembly 6 and the resonance frequency fd of the displacer assembly 8.

Next, a fourth embodiment of the present invention is described with reference to FIGS. 1 to 3, 10A through 11C. Here, the structure of the piston assembly 6 and the displacer assembly 8 is the same as that described in the first to the third embodiments, and thus the description thereof is omitted. Described hereunder is the adjustment of the movable masses mp, md.

On a side of the connection main body 17 that is opposite to the piston 5, there is formed the female screw 22 coaxial with the second male screw 19, the connection main body 17 composing the piston assembly 6. Namely, on the side of the connection main body 17 that is opposite to the piston 5, the second male screw 19 is formed outside, and the female screw 22 is formed inside. The tip end side of the connection main body 17 having the female screw 22 is a female screw member. A bolt 29 as a male screw member is to be screwed to the female screw 22. Further, an attachment portion 30 is composed of the female screw member having the female screw 22 and a bolt 29 as the male screw member. Namely, the attachment portion 30 is provided on a side of the first leaf spring 11 that is opposite to the piston 5. Further, by screwing together the female screw 22 and the bolt 29, a washer 51 serving as a weight body can be sandwiched between the connection main body 17 and the bolt 29. Here, this washer 51 is any of the multiple types of washers with different diameters (51a, 51b, . . . ).

Next, described is a method for adjusting a resonance frequency fp of the piston assembly 6 in this embodiment. At first, a spring constant kp is measured by attaching the outer circumferential portion of the first leaf spring 11 to a measurement jig (not shown), and applying a stress to the first leaf spring 11. Here, the measurement jig is of a similar positional relation as the support arm portion 25. Further, the measurement of the spring constant kp is not performed with regard to each first leaf spring 11, but performed per production lot. In general, a resonance frequency f in a vibration system composed of a reciprocating object and an elastic body connected to such object is expressed by the following formula.

$$f = (1/2\pi)\sqrt{(k/m)}$$

In this formula, k is a spring constant of the elastic body, and m is a movable mass. Thus, a target resonance frequency fpt of the piston assembly 6 is expressed by the following formula.

$$fpt = (1/2\pi)\sqrt{(kp/mp)}$$

Since the target resonance frequency fpt and the spring constant kp of the first leaf spring 11 are known, the movable mass mp of the piston assembly 6 can be calculated. Here, the movable mass mp is a sum of the mass $m_5$ of the piston 5, the mass $m_{12}$ of the mover 12, the mass $m_{17}$ of the connection main body 17, the mass $m_{18}$ of the nut 18, the mass $m_{29}$ of the bolt 29, the mass $m_{11}$ of the first leaf spring 11 excluding the outer circumferential portion thereof, and a mass $m_{51}$ ($m_{51a}$, $m_{51b}$, . . . ) of the washer 51. Here, $m_5$, $m_{12}$, $m_{17}$, $m_{18}$, $m_{29}$, and $m_{51}$ ($m_{51a}$, $m_{51b}$, . . . ) are measured in advance. However, the measurement of these masses is not performed with regard to each member, but performed per production lot. Further, $m_{11}$ is a calculated value. Thus, the above formula can be converted as follows.

$$fpt = (1/2\pi)\sqrt{(kp/(m_5 + m_{12} + m_{17} + m_{18} + m_{29} + m_{11} + xm_{51a} + ym_{51b}))}$$

Here, in this example, while the washers 51 are 2 pieces of small-diameter washers (51a) (x=2, y=0) as is shown in FIG. 10B serving as a reference, the number and type(s) of the washers 51a, 51b, . . . vary depending on the value of kp. The piston 5, the mover 12, and the connection main body 17 that occupy a large portion of the movable mass mp inherently have small tolerances as they are manufactured with high precisions. Further, although the nut 18, the bolt 29, and the washer 51 are standardized products, since their masses are small, the differences in mass have a relatively small impact on the resonance frequency fp. In terms of calculation, this allows the resonance frequency fp of the piston assembly 6 to be brought closer to the target resonance frequency fpt, but in practice, the resonance frequency fp sometimes deviates from the target resonance frequency fpt by an allowable range or more. As such, when the resonance frequency fp deviates from the target resonance frequency fpt by an allowable range or more, the deviation can be addressed by changing the number and type of the washer 51 to be attached. If there is a need to reduce the value of the movable mass mp, the washer 51 is changed to a piece of small-diameter washer (51a) (i.e., x=1, y=0) as is shown in FIG. 10A, for example. Further, if there is a need to increase the value of the movable mass mp, the washer 51 is changed to a piece of small-diameter washer (51a) and a piece of large-diameter washer (51b) (i.e., X=1, y=1) as is shown in FIG. 10C, for example. In this way, by changing the number and type(s) of the washers 51 that are to be sandwiched when screwing the bolt 29 to the female screw 22, the value of the movable mass mp is adjusted, which allows the resonance frequency fp of the piston assembly 6 to be brought closer to the target resonance frequency fpt. Here, by reducing the difference in diameter and thickness between the washers 51 (51a, 51b, . . . ), the step of adjusting the movable mass mp can be carried out finely.

Here, in the case of the free-piston Stirling refrigerator 1, since the coaxiality of the piston 5 and the first cylinder 3 is required to be of a high precision, if the piston assembly 6 is disassembled once for adjustment of the movable mass mp, readjustment of the coaxiality of the piston 5 and the first cylinder 3 is necessary when reassembling the piston assembly 6. However, as described above, since the attachment portion 30 is provided on the side of the first leaf spring 11 that is opposite to the piston 5, even when the piston 5 is inserted in the first cylinder 3 with the piston assembly 6 being supported by the support arm portion 25, the movable mass mp can be adjusted by appropriately changing the type(s) of the washers 51 (51*a*, 51*b*, . . . ) to be attached. Namely, the resonance frequency fp can be easily brought closer to the target resonance frequency fpt without impairing the coaxiality of the piston 5 and the first cylinder 3.

The tip end side of the male screw 37 of the rod 34 composing the displacer assembly 8 is the male screw member composing part of the attachment portion 43. The second nut 44 serves as the female screw member composing part of the attachment portion 43, and the second nut 44 is screwed to the male screw 37. Namely, the attachment portion 43 is provided on the side of the second leaf spring 32 that is opposite to the displacer 7. Further, the washer 52 serving as a weight body can be sandwiched between the first nut 35 and the second nut 44 by screwing the male screw member having the male screw 37 to the second nut 44 serving as the female screw member. Here, this washer 52 is any of the multiple types of washers with different diameters (52*a*, 52*b*, . . . ).

Next, described hereunder is a method for adjusting the resonance frequency fd of the displacer assembly 8 in this embodiment. At first, a spring constant kd is measured by attaching the outer circumferential portion of the second leaf spring 32 to a measurement jig (not shown), and applying a stress to the second leaf spring 32. Here, the measurement jig is of a similar positional relation as the support arm portion 40. Further, the measurement of the spring constant kd is not performed with regard to each second leaf spring 32, but performed per production lot. As is the case with the piston assembly 6, a target resonance frequency fdt of the displacer assembly 8 is expressed by the following formula.

$$fdt = (1/2\pi)\sqrt{(kd/md)}$$

Since the target resonance frequency fdt and the spring constant kd of the second leaf spring 32 are known, the movable mass md of the displacer assembly 8 can be calculated. Here, the movable mass md is a sum of the mass my of the displacer 7, the mass $m_{34}$ of the rod 34, the mass $m_{35}$ of the first nut 35, the mass $m_{44}$ of the second nut 44, the mass $m_{32}$ of the second leaf spring 32 excluding the outer circumferential portion thereof, and the mass $m_{52}$ ($m_{52}a$, $m_{52}b$, . . . ) of the washer 52. Here, $m_7$, $m_{34}$, $m_{35}$, $m_{44}$, and $m_{52}$ ($m_{52}a$, $m_{52}b$, . . . ) are measured in advance. However, the measurement of these masses is not performed with regard to each member, but performed per production lot. Further, $m_{32}$ is a calculated value. Thus, the above formula can be converted as follows.

$$fdt = (1/2\pi)\sqrt{(kd/(m_7 + m_{34} + m_{35} + m_{44} + m_{32} + xm_{52a} + ym_{52b}))}$$

Here, in this example, while the washers 52 are 2 pieces of washers having a small diameter (52*a*) (x=2, y=0) as is shown in FIG. 11B serving as a reference, the number and type(s) of the washers 52*a*, 52*b*, . . . vary depending on the value of kp. The displacer 7 and the rod 34, which occupy a large portion of the movable mass md, are manufactured with high precisions, so that the tolerances are inherently small. Further, the first nut 35, the second nut 44, and the washer 52 are standardized products, but the masses thereof are small, so that the impact on the resonance frequency fd due to the mass difference is relatively small. In terms of calculation, this allows the resonance frequency fd of the displacer assembly 8 to be brought closer to the target resonance frequency fdt, but in practice, the resonance frequency fd sometimes deviates from the target resonance frequency fdt by an allowable range or more. As such, when the resonance frequency fd deviates from the target resonance frequency fdt by an allowable range or more, the deviation can be addressed by changing the number and type(s) of the washer 52 to be attached. When the value of the movable mass md needs to be decreased, the washer 52 is changed to a piece of small-diameter washer (52*a*) (i.e., x=1, y=0) as is shown in FIG. 11A, for example. Further, when the value of the movable mass md needs to be increased, the washer 52 is changed to a piece of small-diameter washer (52*a*) and a piece of large-diameter washer (52*b*) (i.e., x=1, y=1) as is shown in FIG. 11C, for example. In this way, by changing the number and type(s) of the washers 52 that are to be sandwiched when screwing the bolt 29 to the female screw 22, the value of the movable mass md is adjusted, which allows the resonance frequency fd of the displacer assembly 8 to be brought closer to the target resonance frequency fdt. Here, by reducing the differences in diameter and thickness between the washers 52 (52*a*, 52*b*, . . . ), the step of adjusting the movable mass md can be carried out finely.

Here, in the case of the free-piston Stirling refrigerator 1, since the coaxiality of the displacer 7 and the second cylinder 4 is required to be of a high precision, once the displacer assembly 8 has been disassembled for the purpose of adjusting the movable mass md, readjustment of the coaxiality of the displacer 7 and the second cylinder 4 will be necessary when reassembling the displacer assembly 8. However, as described above, since the attachment portion 43 is provided on the side of the second leaf spring 32 that is opposite to the displacer 7, even when the displacer 7 is inserted in the second cylinder 4 with the displacer assembly 8 being supported by the support arm portion 40, the movable mass md can be adjusted by removing only the second nut 44 from the displacer assembly 8 and by appropriately selecting the number and type(s) of the washers 52 (52*a*, 52*b*, . . . ) to be attached. Namely, the resonance frequency fd is allowed to be easily brought closer to the target resonance frequency fdt without impairing the coaxiality of the displacer 7 and the second cylinder 4.

In this way, by changing the number and type(s) of washers 51 (51*a*, 51*b*, . . . ) attached to the piston assembly 6, and the number and type(s) of washers 52 (52*a*, 52*b*, . . . ) attached to the displacer assembly 8, the resonance frequency fp of the piston assembly 6 can be brought closer to the target resonance frequency fpt and the resonance frequency fd of the displacer assembly 8 can be brought closer to the target resonance frequency fdt. The attachment portion 30 is provided on the side of the first leaf spring 11 that is opposite to the piston 5, making it possible to easily adjust the resonance frequency fp even in a state where the piston assembly 6 is supported by the support arm portion 25 and the piston 5 is inserted in the first cylinder 3. Similarly, the attachment portion 43 is provided on the side of the second leaf spring 32 that is opposite to the displacer 7, making it possible to easily adjust the resonance frequency fd even in a state where the displacer assembly 8 is supported by the support arm portion 40 and the displacer 7 is inserted in the second cylinder 4. Accordingly, since it is not necessary to disassemble the piston assembly 6 after measuring the resonance frequency fp of the piston assembly 6 as in the conventional case, not only the risk of component damage associated with assembly and disassembly (specifically, the risks of, for example, stripping the screw threads, and having a component collide with other objects and causing scratches) can be reduced, but also the movable mass mp can be adjusted without impairing the coaxiality of the piston 5 and the first cylinder 3 that has once already been adjusted. Similarly, since it is not necessary to disassemble the displacer assembly 8 after measuring the resonance frequency fd of the displacer assembly 8, not only the risk of component damage associated with assembly and disassembly can be reduced, but also the movable mass md can be adjusted without impairing the coaxiality of the displacer 7 and the second cylinder 4 that has once already been adjusted. Further, since the attachment portions 30, 43 are provided coaxially with the piston assembly 6 and the displacer assembly 8, respectively, the washers 31, 45 serving as weight bodies can be coaxially attached to the attachment portions 30, 43, which leads to a favorable weight balance between the piston assembly 6 and the displacer assembly 8 and thereby allows the reciprocating motions of the piston 5 and the displacer 7 to be performed in a well-balanced manner. In addition, the washers 51, 52 are used as weight bodies, and the number and type(s) of the washers having different diameters (51a, 51b, . . . , 52a, 52b, . . . ) are changed and sandwiched, making it possible to easily adjust the resonance frequency fp of the piston assembly 6 and the resonance frequency fd of the displacer assembly 8.

Next, a fifth embodiment of the present invention is described with reference to FIGS. 1 to 3 and 12A to 12C. Here, the structure of the piston assembly 6 is the same as that described in the first to the fourth embodiments, and thus the description thereof is omitted. Described hereunder is the adjustment of the movable masses mp.

On a side of the connection main body 17 that is opposite to the piston 5, there is formed the female screw 22 coaxial with the second male screw 19, the connection main body 17 composing the piston assembly 6. Namely, on the side of the connection main body 17 that is opposite to the piston 5, the second male screw 19 is formed outside, and the female screw 22 is formed inside. The tip end side of the connection main body 17 having the female screw 22 is a female screw member, and an attachment portion 71 is composed of the female screw member. Namely, the attachment portion 71 is provided on a side of the first leaf spring 11 that is opposite to the piston 5. Further, a bolt 72 as the male screw member is screwed to the female screw 22. This bolt 72 serves as a weight body. Here, this bolt 72 is any of multiple types of bolts with different lengths (72a, 72b, 72c, . . . ).

Next, described is a method for adjusting a resonance frequency fp of the piston assembly 6 in this embodiment. At first, a spring constant kp is measured by attaching the outer circumferential portion of the first leaf spring 11 to a measurement jig (not shown), and applying a stress thereto. Here, the measurement jig is of a similar positional relation as the support arm portion 25. Further, the measurement of the spring constant kp is not performed with regard to each first leaf spring 11, but performed per production lot. In general, a resonance frequency f in a vibration system composed of a reciprocating object and an elastic body connected to such object is expressed by the following formula.

$$f = (1/2\pi)\sqrt{(k/m)}$$

In this formula, k is a spring constant of the elastic body, and m is a movable mass. Thus, a target resonance frequency fpt of the piston assembly 6 is expressed by the following formula.

$$fpt = (1/2\pi)\sqrt{(kp/mp)}$$

Since the target resonance frequency fpt and the spring constant kp of the first leaf spring 11 are known, the movable mass mp of the piston assembly 6 can be calculated. Here, the movable mass mp is a sum of the mass $m_5$ of the piston 5, the mass $m_{12}$ of the mover 12, the mass $m_{17}$ of the connection main body 17, the mass $m_{18}$ of the nut 18, a mass $m_{72}$ of the bolt 72, and the mass $m_{11}$ of the first leaf spring 11 excluding the outer circumferential portion thereof. Here, $m_5$, $m_{12}$, $m_{17}$, $m_{18}$, and $m_{72}$ are measured in advance. However, the measurement of these masses is not performed with regard to each member, but performed per production lot. Further, $m_{11}$ is a calculated value. Thus, the above formula can be converted as follows.

$$fpt = (1/2\pi)\sqrt{(kp/(m_5 + m_{12} + m_{17} + m_{18} + m_{11} + m_{72}))}$$

Figure 12:
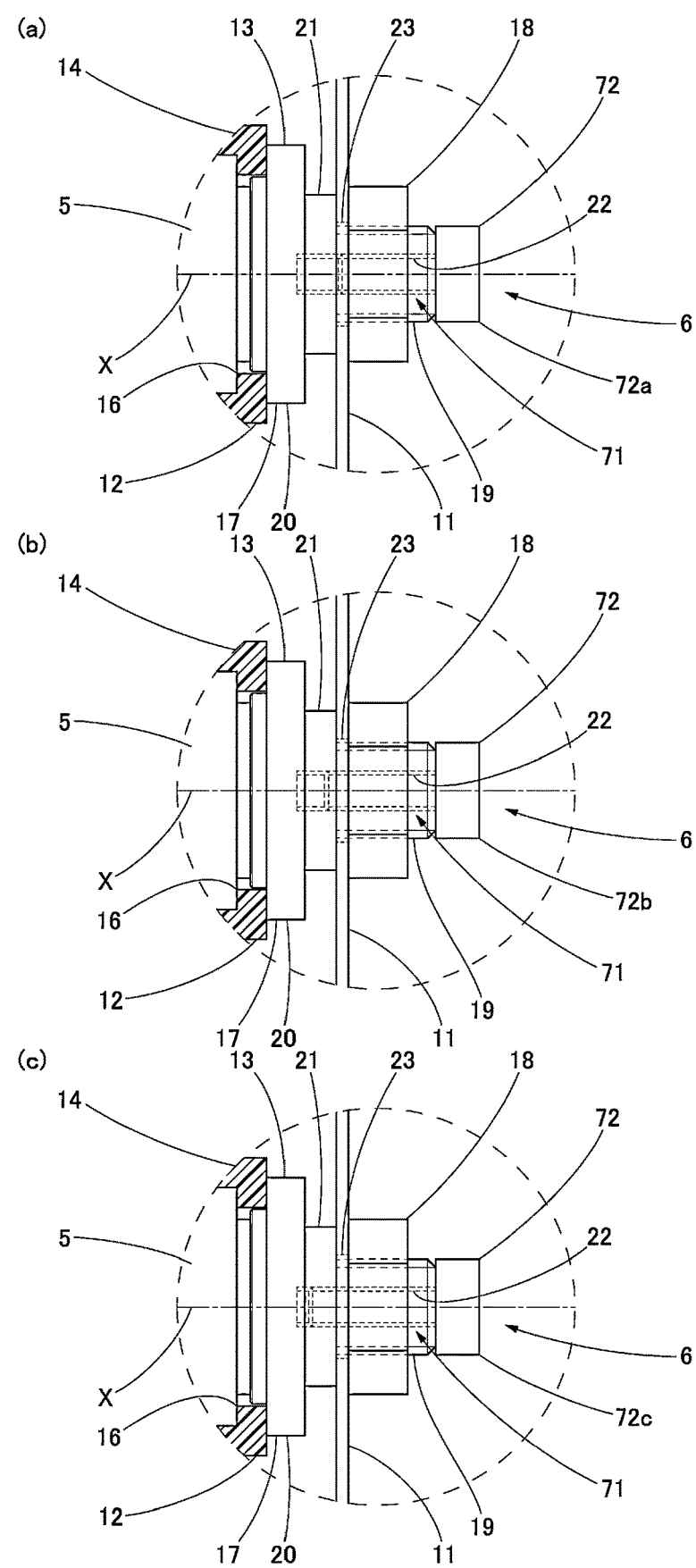
FIG. 12A is an explanatory diagram for explaining adjustments of a movable mass of a piston assembly in a free-piston Stirling engine of a fifth embodiment of the present invention, in which a shorter bolt 72a is used.
FIG. 12B is an explanatory diagram for explaining adjustments of the movable mass of the piston assembly in the free-piston Stirling engine of the fifth embodiment of the present invention, in which a bolt 72b with a medium length is used.
FIG. 12C is an explanatory diagram for explaining adjustments of the movable mass of the piston assembly in the free-piston Stirling engine of the fifth embodiment of the present invention, in which a longer bolt 72c is used.

Here, in this example, while the bolt 72 is a bolt 72b having a medium length as is shown in FIG. 12B serving as a reference, the selection of any of the bolts 72a, 72b, 72c, . . . varies depending on the value of kp. The piston 5, the mover 12, and the connection main body 17 that occupy a large portion of the movable mass mp inherently have small tolerances as they are manufactured with high precisions. Further, although the nut 18 and the bolt 72 are standardized products, since their masses are small, the differences in mass have a relatively small impact on the resonance frequency fp. In terms of calculation, this allows the resonance frequency fp of the piston assembly 6 to be brought closer to the target resonance frequency fpt, but in practice, the resonance frequency fp sometimes deviates from the target resonance frequency fpt by an allowable range or more. As such, when the resonance frequency fp deviates from the target resonance frequency fpt by an allowable range or more, the deviation can be addressed by changing the type of the bolt 72 to be attached. If there is a need to reduce the value of the movable mass mp, the bolt 72 is changed to a shorter one (72a) as is shown in FIG. 12A, for example. Further, if there is a need to increase the value of the movable mass mp, the bolt 72 is changed to a longer one (72c) as is shown in FIG. 12C, for example. In this way, by selecting the type of the bolt 72 that is to be screwed to the female screw 22, the value of the movable mass mp is adjusted, which allows the resonance frequency fp of the piston assembly 6 to be brought closer to the target resonance frequency fpt. Here, by reducing the difference in length between the bolts 72 (72a, 72b, 72c, . . . ), the step of adjusting the movable mass mp can be carried out finely.

Here, in the case of the free-piston Stirling refrigerator 1, since the coaxiality of the piston 5 and the first cylinder 3 is required to be of a high precision, if the piston assembly 6 is disassembled once for adjustment of the movable mass mp, readjustment of the coaxiality of the piston 5 and the first cylinder 3 is necessary when reassembling the piston assembly 6. However, as described above, since the attachment portion 71 is provided on the side of the first leaf spring 11 that is opposite to the piston 5, even when the piston 5 is inserted in the first cylinder 3 with the piston assembly 6 being supported by the support arm portion 25, the movable mass mp can be adjusted by removing the bolt 72 (72a, 72b, 72c, . . . ) alone from the piston assembly 6 and replacing it with another bolt 72 (72a, 72b, 72c, . . . ). Namely, the resonance frequency fp can be easily brought closer to the target resonance frequency fpt without impairing the coaxiality of the piston 5 and the first cylinder 3.

In this way, by selecting the type of the bolt 72 (72a, 72b, 72c, . . . ) attached to the piston assembly 6, the resonance frequency fp of the piston assembly 6 can be brought closer to the target resonance frequency fpt. The attachment portion 71 is provided on the side of the first leaf spring 11 that is opposite to the piston 5, making it possible to easily adjust the resonance frequency fp even in a state where the piston assembly 6 is supported by the support arm portion 25 and the piston 5 is inserted in the first cylinder 3. Accordingly, since it is not necessary to disassemble the piston assembly 6 after measuring the resonance frequency fp of the piston assembly 6 as in the conventional case, not only the risk of component damage associated with assembly and disassembly (specifically, the risks of, for example, stripping the screw threads, and having a component collide with other objects and causing scratches) can be reduced, but also the movable mass mp can be adjusted without impairing the coaxiality of the piston 5 and the first cylinder 3 that has once already been adjusted. Further, since the attachment portion 71 is provided coaxially with the piston assembly 6, the bolt 72 serving as the weight body can be coaxially attached to the attachment portion 71, which leads to a favorable weight balance of the piston assembly 6, and thereby allows the reciprocating motion of the piston 5 to be performed in a well-balanced manner. In addition, the movable mass mp can be easily adjusted by allowing the bolt 72 as the male screw to be a weight body, allowing the attachment portion 71 to be the female screw 22, allowing the bolt 72 to be able to be screwed to the female screw 22, and allowing any of the multiple types of the bolts 72 (72a, 72b, 72c, . . . ) with different weights to be able to be screwed to the female screw 22.

However, the present invention shall not be limited to the above embodiments: the invention may be variously modified and exploited within the scope of the gist of the present invention. For example, in the fourth embodiment, the movable masses mp, md are adjusted by employing a combination of the washers 51a, 51b, . . . or 52a, 52b, . . . with different diameters, however, the movable masses mp, md may be adjusted by employing another combination of the washers 61a, 61b, or 62a, 62b . . . with different thicknesses. Further, the movable masses mp, md may be adjusted by employing another combination of the washers with different diameters and the washers with different thicknesses. Moreover, in each of the above embodiments, the mass is adjusted by using weight bodies having different sizes, but the mass may be adjusted by weight bodies made of different materials. Furthermore, in each of the above embodiments, while the reciprocating body and the connection body are provided as separate components, they may also be configured into one integral component.

DESCRIPTION OF THE SYMBOLS

1 Free-piston Stirling refrigerator (free-piston Stirling engine)
3 First cylinder
4 Second cylinder
5 Piston (reciprocating body)
6 Piston assembly
7 Displacer (reciprocating body)
8 Displacer assembly
11 First leaf spring (elastic body)
13 Connection body
17 Connection main body (female screw member)
22 Female screw
25 Support arm portion (support body)
29 Bolt (male screw member)
30 Attachment portion
31 Washer (weight body)
32 Second leaf spring (elastic body)
33 Connection body
37 Male screw (male screw member)
40 Support arm portion (support body)
43 Attachment portion
44 Second nut (female screw member)
45 Washer (weight body)
51, 51a, 51b, 51c . . . . Washer (weight body)
52, 52a, 52b, 52c . . . . Washer (weight body)
61, 61a, 61b, 61c . . . . Washer (weight body)
62, 62a, 62b, 62c . . . . Washer (weight body)
71 Attachment portion
72, 72a, 72b, 72c . . . . Bolt (male screw member, weight body)
f Resonance frequency
fp Resonance frequency of piston assembly 6
fpt Target resonance frequency of piston assembly 6
fd Resonance frequency of displacer assembly 8
fdt Target resonance frequency of displacer assembly 8
k Spring constant of elastic body
Kp Spring constant of first leaf spring 11
Kd Spring constant of second leaf spring 32
m Movable mass
mp Movable mass of piston assembly 6
md Movable mass of displacer assembly 8

What is claimed is:
1. A free-piston Stirling engine comprising:
a cylinder;
a reciprocating body capable of reciprocating inside the cylinder along an axial direction of the cylinder;
an elastic body for controlling a reciprocating motion of the reciprocating body;
a connection body for connecting the reciprocating body to a movable portion of the elastic body;
a support body for fixing a fixation portion of the elastic body with the cylinder;
a weight body for adjusting a movable mass including the reciprocating body and the connection body; and
an attachment portion for attaching the weight body, wherein
the connection body has a connection main body and a nut,
the connection main body is fixed to the reciprocating body, the movable portion of the elastic body is sandwiched by the connection main body and the nut, the attachment portion is composed of a female screw member and a male screw member that is to be screwed to the female screw member, the male screw member is provided on the side of the elastic body that is opposite to the reciprocating body, and the weight body is sandwiched by the connection main body and the male screw member.

2. The free-piston Stirling engine according to claim 1, wherein the elastic body is a leaf spring, and the attachment portion is provided on a side of the leaf spring that is opposite to the reciprocating body.

3. The free-piston Stirling engine according to claim 2, wherein the attachment portion is coaxial with the reciprocating body, and the weight body is coaxially attached to the attachment portion.

4. The free-piston Stirling engine according to claim 3, wherein the weight body is a washer.

5. A free-piston Stirling engine comprising:

a cylinder;

a reciprocating body capable of reciprocating inside the cylinder along an axial direction of the cylinder;

an elastic body for controlling a reciprocating motion of the reciprocating body;

a connection body for connecting the reciprocating body to a movable portion of the elastic body;

a support body for fixing a fixation portion of the elastic body with the cylinder;

a weight body for adjusting a movable mass including the reciprocating body and the connection body; and an attachment portion for attaching the weight body, wherein the connection body has a connection main body and a nut, the connection main body is fixed to the reciprocating body, the movable portion of the elastic body is sandwiched by the connection main body and the nut, the weight body is a male screw member that is provided on the side of the elastic body that is opposite to the reciprocating body, the attachment portion is a female screw member, the male screw member and the female screw member are capable of being screwed together, and any of multiple types of the male screw members with different weights is capable of being screwed to the female screw member.

6. A free-piston Stirling engine comprising:

a cylinder;

a reciprocating body capable of reciprocating inside the cylinder along an axial direction of the cylinder;

an elastic body for controlling a reciprocating motion of the reciprocating body;

a connection body for connecting the reciprocating body to a movable portion of the elastic body;

a support body for fixing a fixation portion of the elastic body with the cylinder; and a weight body for adjusting a movable mass including the reciprocating body and the connection body, wherein the connection body has a rod and a first nut, the rod has a rod main body and a male screw, and is fixed to the reciprocating body, the first nut and a second nut are screwed to the male screw, the rod main body has an end portion that is opposite to the reciprocating body, the movable portion of the elastic body is sandwiched by the end portion of the rod main body and the first nut, the second nut is provided on the side of the elastic body that is opposite to the reciprocating body, and the weight body is sandwiched by the first nut and the second nut.

\* \* \* \* \*